United States Patent
Yu et al.

(10) Patent No.: US 11,734,007 B2
(45) Date of Patent: Aug. 22, 2023

(54) ADDRESS GENERATION METHOD, RELATED APPARATUS, AND STORAGE MEDIUM

(71) Applicant: Tencent Technology (Shenzhen) Company Limited, Shenzhen (CN)

(72) Inventors: Xiaoyu Yu, Shenzhen (CN); Dewei Chen, Shenzhen (CN); Heng Zhang, Shenzhen (CN); Yan Xiong, Shenzhen (CN); Jianlin Gao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/730,058

(22) Filed: Apr. 26, 2022

(65) Prior Publication Data

US 2022/0261249 A1 Aug. 18, 2022

Related U.S. Application Data

(63) Continuation of application No. PCT/CN2021/097563, filed on Jun. 1, 2021.

(30) Foreign Application Priority Data

Jul. 1, 2020 (CN) .......................... 202010623936.5

(51) Int. Cl.
  *G06F 9/30* (2018.01)
  *G06F 9/355* (2018.01)
  *G06F 12/02* (2006.01)

(52) U.S. Cl.
  CPC ........ *G06F 9/3016* (2013.01); *G06F 9/30094* (2013.01); *G06F 9/30149* (2013.01); *G06F 9/355* (2013.01); *G06F 12/0207* (2013.01)

(58) Field of Classification Search
  CPC ............... G06F 9/3016; G06F 9/30094; G06F 9/30149; G06F 9/355; G06F 12/027; G06F 12/06; G06F 9/34–3557
  See application file for complete search history.

(56) References Cited

U.S. PATENT DOCUMENTS

| | | | | |
|---|---|---|---|---|
| 6,021,489 A | * | 2/2000 | Poplingher | ........... G06F 9/3844 |
| | | | | 712/23 |
| 6,266,751 B1 | * | 7/2001 | Niescier | ................ H04L 7/0278 |
| | | | | 711/170 |

(Continued)

FOREIGN PATENT DOCUMENTS

| | | |
|---|---|---|
| CN | 109919311 A | 6/2019 |
| CN | 110516793 A | 11/2019 |

(Continued)

OTHER PUBLICATIONS

Tencent Technology, WO, PCT/CN2021/097563, dated Aug. 23, 2021, 5 pgs.

(Continued)

*Primary Examiner* — William B Partridge
(74) *Attorney, Agent, or Firm* — Morgan, Lewis & Bockius LLP

(57) ABSTRACT

A system parses a very long instruction word (VLIW) to obtain an execution parameter. The system obtains a first sliding window width count, a first sliding window height count, a first feature map width count, and a first feature map height count that correspond to first target data. In accordance with a determination that the first sliding window width count falls within the sliding window width range, the first sliding window height count falls within the sliding window height range, (the first feature map width count falls within the feature map width range, and the first feature map height count falls within the feature map height range, the system determines an offset of the first target data. The (Continued)

system also obtains a starting address of the first target data, and adds the starting address to the offset to obtain a first target address of the first target data.

20 Claims, 12 Drawing Sheets

(56) References Cited

U.S. PATENT DOCUMENTS

| | | | | |
|---|---|---|---|---|
| 2008/0091991 A1* | 4/2008 | Kapoor | ............... | G06F 9/30149 714/724 |
| 2014/0019727 A1* | 1/2014 | Zhu | ................ | G06F 9/3824 712/221 |
| 2016/0378488 A1* | 12/2016 | Burger | ................ | G06F 9/3859 712/16 |
| 2019/0034327 A1* | 1/2019 | Temam | ............... | G06F 9/30043 |
| 2019/0065201 A1* | 2/2019 | Robinson | ................ | G06F 9/324 |
| 2019/0294438 A1* | 9/2019 | Wang | ................ | G06N 3/048 |
| 2020/0160226 A1* | 5/2020 | Ross | ................ | G06F 17/16 |

FOREIGN PATENT DOCUMENTS

| | | |
|---|---|---|
| CN | 110766127 A | 2/2020 |
| CN | 110780921 A | 2/2020 |
| CN | 111079917 A | 4/2020 |
| CN | 111199278 A | 5/2020 |
| CN | 111506520 A | 8/2020 |

OTHER PUBLICATIONS

Tencent Technology, IPRP, PCT/CN2021/097563, dated Dec. 13, 2022, 6 pgs.
Tencent Technology, ISR, PCT/CN2021/097563, dated Aug. 23, 2021, 2 pgs.

* cited by examiner

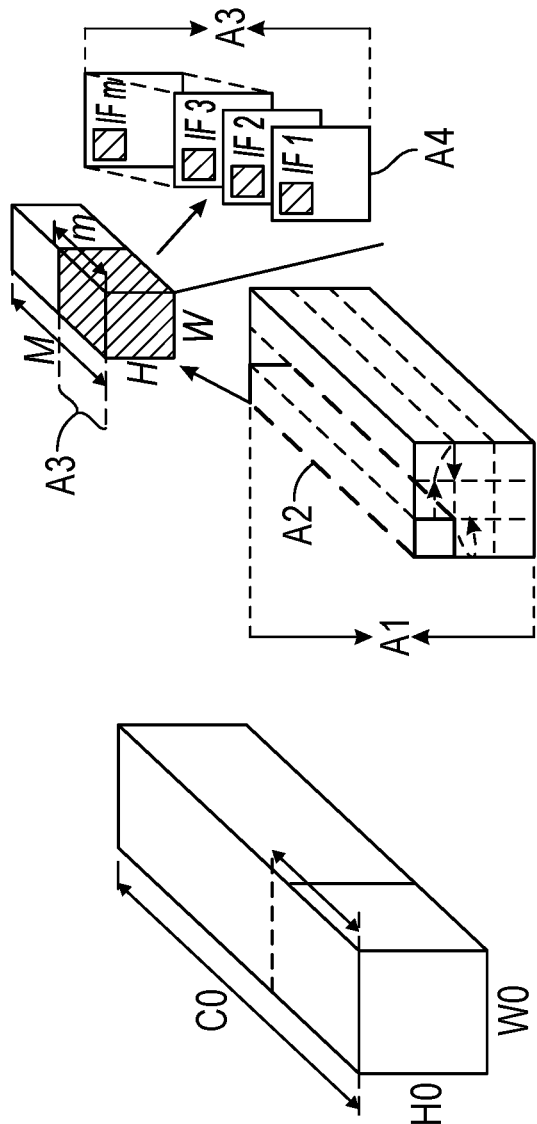
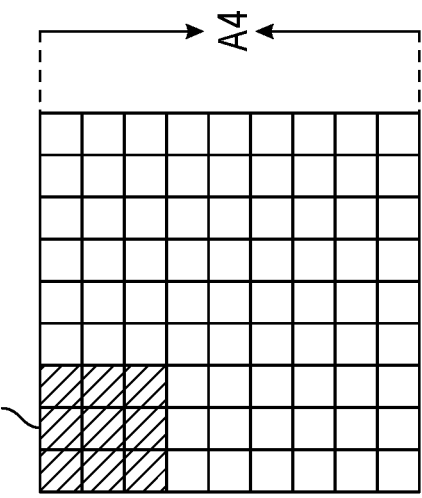
FIG. 1A
FIG. 1B
FIG. 1C

ADDRESS GENERATION METHOD, RELATED APPARATUS, AND STORAGE MEDIUM

CROSS-REFERENCE TO RELATED APPLICATIONS

This application is a continuation application of PCT Patent Application No. PCT/CN2021/097563, entitled "ADDRESS GENERATION METHOD, RELATED DEVICE AND STORAGE MEDIUM" filed on Jun. 1, 2021, which claims priority to Chinese Patent Application No. 202010623936.5, filed with the State Intellectual Property Office of the People's Republic of China on Jul. 1, 2020, and entitled "ADDRESS GENERATION METHOD, RELATED APPARATUS, AND STORAGE MEDIUM", all of which are incorporated herein by reference in their entirety.

FIELD OF THE TECHNOLOGY

This application relates to the field of chip technologies, and in particular, to data access technologies.

BACKGROUND OF THE DISCLOSURE

As semiconductor technologies are developed, computing capabilities of hardware are rapidly enhanced, and the processing time of various big data is shortened accordingly. Based on this, artificial neural network technologies are further developed. Neural networks are usually very large. This means that these neural networks require many computing resources and storage resources. Addressing is critical in connecting computing to storage, and computing efficiency largely depends on whether data can arrive quickly. Therefore, the requirement on the processing efficiency of deep learning processors becomes higher.

In the design of a vector processor, an address of regular data may be accessed in a stride access mode. To be specific, a stride may be added to an access address of current data to compute an access address of next data. In the stride access mode, an address generation unit (AGU) generates continuous access addresses, and the overhead can also be reduced by accessing the memory pipeline multiple times.

A deep learning processor needs to perform many tensor operations. However, the stride access mode is designed for a vector operation and cannot support multiple parameters in a tensor traversal process. As a result, the tensor traversal process is often interrupted by a control signal, reducing the efficiency of data access.

SUMMARY

An embodiment of this application provides an address generation method, including:

parsing a very long instruction word (VLIW) to obtain an execution parameter, the execution parameter being used to determine a sliding window width range, a sliding window width stride, a sliding window height range, a sliding window height stride, a feature map width range, and a feature map height range;

obtaining, in accordance with a determination that a depth count corresponding to the first target data does not fall within a depth count range, a first sliding window width count, a first sliding window height count, a first feature map width count, and a first feature map height count that correspond to the first target data;

determining an offset of the first target data according to the first sliding window width count, the sliding window width stride, the first sliding window height count, the sliding window height stride, the first feature map width count, and the first feature map height count in accordance with a determination that (i) the first sliding window width count falls within the sliding window width range, (ii) the first sliding window height count falls within the sliding window height range, (iii) the first feature map width count falls within the feature map width range, and (iv) the first feature map height count falls within the feature map height range;

obtaining a starting address of the first target data; and adding the starting address to the offset, to obtain a first target address of the first target data.

According to a second aspect, this application provides an address generation unit, including:

a parsing module, configured to parse a very long instruction word to obtain an execution parameter, the execution parameter being used to determine a sliding window width range, a sliding window width stride, a sliding window height range, a sliding window height stride, a feature map width range, and a feature map height range;

an obtaining module, configured to obtain, in accordance with a determination that a depth count corresponding to the first target data does not fall within a depth count range, a first sliding window width count, a first sliding window height count, a first feature map width count, and a first feature map height count that correspond to the first target data;

a determining module, configured to determine an offset of the first target data according to the first sliding window width count, the sliding window width stride, the first sliding window height count, the sliding window height stride, the first feature map width count, and the first feature map height count in accordance with a determination that the first sliding window width count falls within the sliding window width range, the first sliding window height count falls within the sliding window height range, the first feature map width count falls within the feature map width range, and the first feature map height count falls within the feature map height range;

the obtaining module being further configured to obtain a starting address of the first target data; and a computing module, configured to add the starting address to the offset, to obtain a first target address of the first target data.

According to a third aspect, this application provides an address generation unit, configured to perform the method of the first aspect.

According to a fourth aspect, this application provides a deep learning processor, including at least two address generation units of the third aspect; the at least two address generation units including at least one address generation unit for reading data and at least one address generation unit for writing data.

According to a fifth aspect, this application provides a chip, including the deep learning processor of the fourth aspect.

According to a sixth aspect, this application provides an electronic device, including the chip of the fifth aspect.

According to another aspect, this application provides a non-transitory computer-readable storage medium, storing instructions, where the instructions, when executed on a computer, causing the computer to execute the methods of the foregoing aspects.

According to another aspect, this application provides a computer program product or a computer program.

Embodiments of this application provide an address generation method. Based on a computing characteristic of a tensor, corresponding execution parameters are configured for the tensor in different dimensions such as a depth, a sliding window, and a feature map. A target address corresponding to data is computed according to the execution parameters and counts of data in different dimensions such as a depth, a sliding window, and a feature map. In this way, data can be read sequentially on the inputted tensor, thereby improving data access efficiency.

BRIEF DESCRIPTION OF THE DRAWINGS

FIG. 1 is a schematic diagram of an embodiment of a tensor according to embodiments of this application;

DESCRIPTION OF EMBODIMENTS

Figure 2:
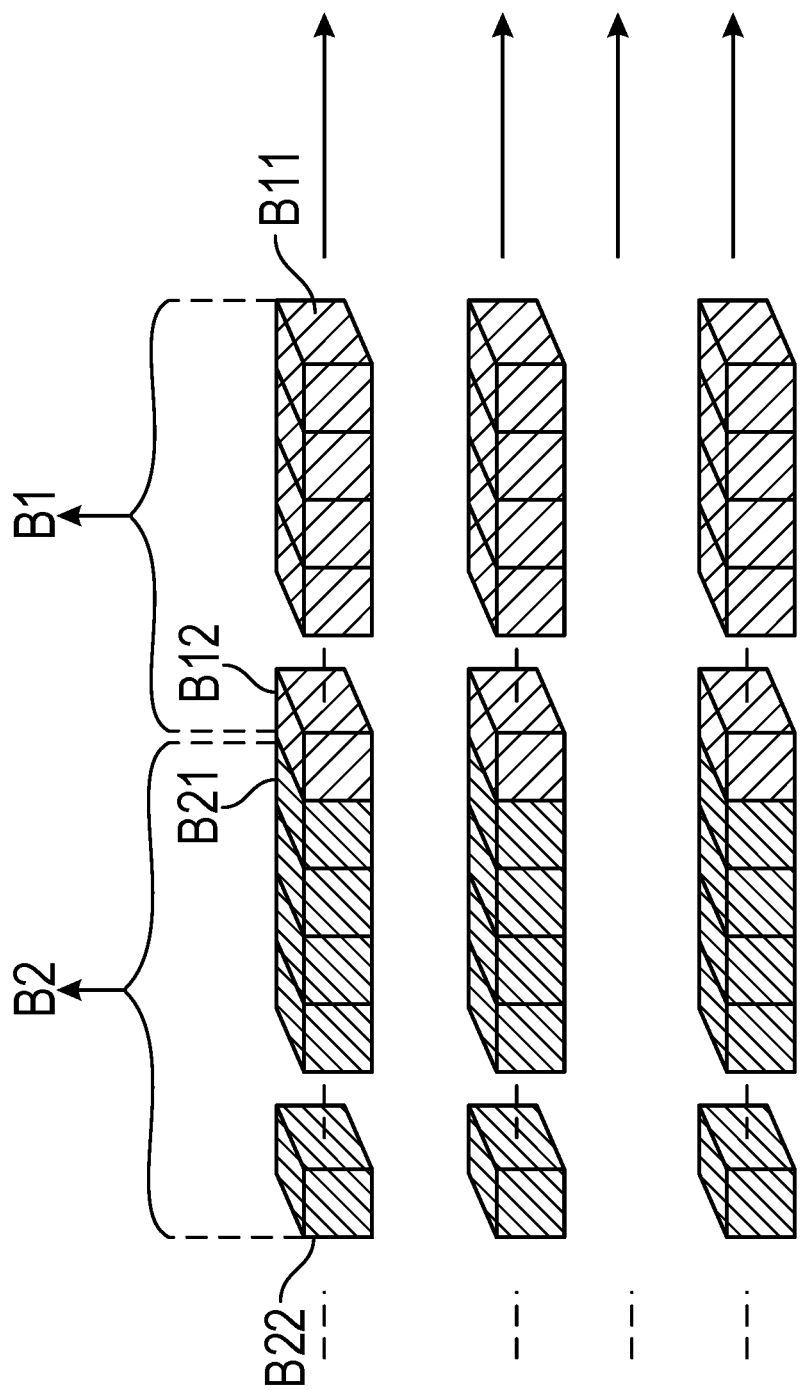
FIG. 2 is a schematic diagram of an embodiment of a tensor computing process according to embodiments of this application.

Embodiments of this application provide an address generation method, a related apparatus, and a computer-readable storage medium. Based on a computing characteristic of a tensor, corresponding execution parameters are configured for the tensor in different dimensions such as a depth, a sliding window, and a feature map. A target address corresponding to data is computed according to the execution parameters and counts of data in different dimensions such as a depth, a sliding window, and a feature map. In this way, data is read sequentially on the inputted tensor, thereby improving data access efficiency.

This application provides an address generation method for a tensor. The method is specifically applied to a deep learning processor. To better understand this application, some concepts in this application are described below.

First: Tensor.

1. Batch.

FIG. 1 is a schematic diagram of an embodiment of a tensor according to embodiments of the application. Drawing (A) in FIG. 1 shows a batch of a tensor. A depth of the batch is denoted as C0, a height of the batch is denoted as H0, and a width of the batch is denoted as W0.

2. Tile.

Refer to drawing (B) in FIG. 1. A1 indicates a batch. After a batch is cut, a tile indicated by A2 can be obtained. A depth of the tile is denoted as M, a height of the tile is denoted as H, and a width of the tile is denoted as W. A tile is obtained after cutting a tensor because an on-chip memory cannot cache the entire tensor. If the on-chip memory can cache the entire tensor, cutting in the tile dimension is not required, that is, the entire tensor can be considered as a tile.

3. Slice.

Refer to drawing (B) in FIG. 1. A3 indicates a slice. After a tile is cut, a slice indicated by A3 can be obtained. A height of the slice is denoted as H, and a width of the slice is denoted as W. When coordinates of the width and the height of the slice are (x, y), a corresponding vector with a length m is obtained.

4. Feature map.

Refer to drawing (B) in FIG. 1. A4 indicates a feature map with a size H*W*1. "l" denotes a depth of the feature map. After a slice is cut, a feature map indicated by A4 can be obtained. Assuming that the slice corresponds to 128 data channels, 128 feature maps can be obtained by cutting the slice.

5. Kernel window, also abbreviated as "window". "Window" or "sliding window" in this application can be understood as "kernel window".

Refer to drawing (C) in FIG. 1. A5 indicates a kernel window. A value of the kernel window depends on sliding on the feature map.

A tensor can include concepts such as a vector, a kernel window, a feature map, a slice, a tile, and a batch.

Second: Tensor operation.

A tensor operation is defined as follows: for an operator (or a function), a data access address is usually regularized and can be computed. A pooling operation is used as an example. Pooling is an operation centered on a loop. After being compiled by a central processing unit (CPU) or a graphics processing unit (GPU), an executed instruction stream includes many repeated instruction segments. A kernel window, a slice, and a batch are used as repetition cycles of a quantity of repeated instructions. An instruction execution sequence is determined. Then, a data arrangement format (for example, batch, height, width, and channels (NHWC)) is determined. Finally, a data access address is determined. That is, data in a kernel window is preferentially accessed, and then the kernel window is moved by a fixed stride to obtain a next kernel window. Therefore, a data access address is regularized and can be computed. Based on the above characteristic, a vector processing unit in a deep learning processor can be optimized according to the characteristic of tensor computing. When each operation is a predictable determinate operation, a bandwidth of the memory access interface can be used to the maximum extent, and all memory access operations are pipelined so that a set of vector data for computing reaches an operation unit in each clock cycle, to reduce memory losses. Therefore, during processing of a three-dimensional tensor, according to corresponding parameters in different dimensions such as vector, kernel window, feature map, slice, tile, and batch, data is sequentially read from the input tensors of one or more batches and is sent to an operation unit, for example, an arithmetic logic unit (ALU). Therefore, design of an address generation unit (AGU) of a chip in a deep learning processor can be simplified according to the tensor memory access characteristics, thereby improving the memory access efficiency.

For ease of understanding, refer to FIG. 2. FIG. 2 is a schematic diagram of an embodiment of a tensor computing process according to embodiments of this application. As shown in FIG. 2, each slice in a tensor corresponds to multiple kernel windows, and a kernel window may further include at least one piece of data. B1 and B2 indicate different kernel windows. Data indicated by B11 to B12 belong to the kernel window B1, and data indicated by B21 to B22 belong to the kernel window B2. The quantity of data between B11 and B12 and the quantity of data between B21 and B22 in FIG. 2 are not limited in this application. The kernel window is slid at a unit of stride on the feature map of each depth. Each time the kernel window is slid, data in the kernel window is sequentially read from an on-chip memory, and data read in multiple kernel windows forms continuous data streams. Each clock cycle corresponds to two-dimensional coordinates of a kernel window, and 1*1*VEP vector data is obtained through indexing and is inputted into multiple ALUs for operation. Specifically, to distinguish data corresponding to different kernel windows, identifiers can be added to the first data and the last data in each kernel window. For example, a start window identifier is added to the first data B11 in the kernel window B1, and an end window identifier is added to the last data B12 in the kernel window B1. In another example, a start window identifier is added to the first data B21 in the next kernel window B2, and an end window identifier is added to the last data B22 in the kernel window B2. Data in the kernel window B1 and data in the kernel window B2 are inputted to the ALU. The ALU can receive a window identifier (that is, the start window identifier or the end window identifier) through a channel. When the start window identifier and the end window identifier of the kernel window are configured as a trigger condition for an operation, when the ALU obtains the start window identifier carried by the first data B11 in the window B1, it can be determined that the data in the kernel window B1 is currently computed. When the ALU obtains the end window identifier carried by the last data B12 in the kernel window B1, it can be determined that input of the data in the current kernel window B1 is completed, and so on.

Third: Deep Learning Processor.

A deep learning processor may compute and supply data. Data supply is to transfer to-be-computed data to a computing unit during computing. Because a memory usually uses a multi-level architecture, data supply usually includes three levels of transfer: an off-chip-memory to an on-chip-memory, the on-chip-memory to an on-chip-near-alu-buffer or the on-chip-memory to an on-chip-near-alu-register file, and the on-chip-near-alu-buffer or the on-chip-near-alu-register file to an ALU. Transfer from an off-chip-memory to an on-chip-memory and from the on-chip-memory to an on-chip-near-alu-buffer or an on-chip-near-alu-register file is mainly performed in a data preparation stage. Transfer from the on-chip-near-alu-buffer or the on-chip-near-alu-register file to the ALU is a data read stage of computing. An AGU provided in this application is configured to solve the problem of the data read stage from the on-chip-near-alu-buffer or the on-chip-near-alu-register file to the ALU, or solve the problem of the data read stage from the on-chip-memory to the ALU. An address generation method provided in this application can be parameterized for tensor access in the AGU, so that one set of parameters can support multiple access modes, to improve versatility of tensor access. In addition, data is sequentially read on an inputted tensor, thereby improving data access efficiency.

Specifically, in the address access of the AGU, a format of an access object is [N, H, W, C], H, [N, H, W, C] implements sequential access of a tensor with a size [1, H', W', $C_{VEP}$]. $C_{VEP}$ represents a sub-tensor obtained after cutting an inputted tensor in a C dimension in a slice. A parallelism of $C_{VEP}$ in the C dimension is consistent with that of an ALU in a single instruction multi data (SIMD) processor. H' and W' are less than or equal to H and W of the inputted tensor respectively. Values of H' and W' depend on a capacity of a memory that can be directly accessed by the computing unit.

Figure 3:
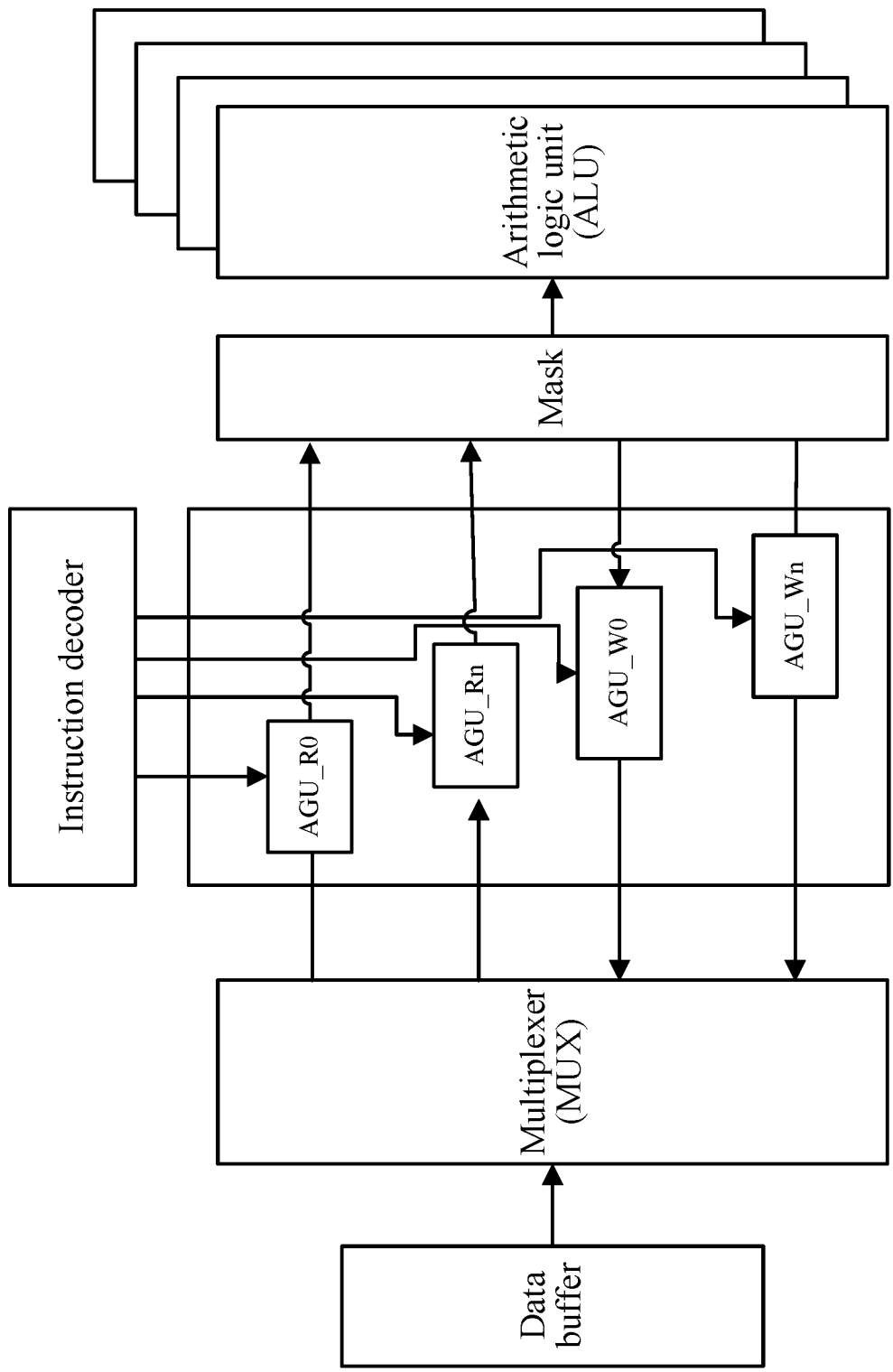
FIG. 3 is a schematic architectural diagram of an address generation unit according to an embodiment of the application.

For ease of understanding, refer to FIG. 3. FIG. 3 is a schematic architectural diagram of an AGU according to an embodiment of the application. As shown in FIG. 3, before the AGU runs, an instruction decoder (ID) parses received SIMD (e.g., accepted SIMD) to obtain an execution parameter of each AGU component and sends the execution parameter to the corresponding AGU. AGUs are classified into an AGU for reading data (that is, an AGU_R) and an AGU for writing back data (that is, an AGU_W). An AGU_R0 to an AGU_Rn in FIG. 3 are all AGUs for reading and can read data from a data buffer (DF), and an AGU_W0 to an AGU_Wn in FIG. 3 are all AGUs for writing and can write data back to the data buffer. Each AGU outputs vector data in each clock (clk) cycle and a data stream is obtained after multiple clocks. It can be understood that, in practical application, a quantity of AGU_Rs and a quantity of AGU_Ws can be adjusted according to design, and a quantity of AGU_Rs and a quantity of AGU_Ws can be the same or different. This is not limited herein.

Before a data operation is performed, execution parameters need to be configured for the AGU_R and the AGU_W. The AGU_R sends a read address in each clock according to a data access sequence of multiple levels of loops, and receives a set of data corresponding to addresses sent before k clocks. After mask gating, the data reaches the ALU after a channel that is not enabled in a depth dimension is blocked. The ALU computes, and after mask gating, sends a result to the AGU_W to trigger the AGU_W to obtain a write-back address of the data. The AGU_W writes the data back to the data buffer through a multiplexer (MUX) path. When the ALU generates multiple results to be written back, the ALU triggers an AGU_W module to output corresponding write-back addresses. It can be understood that the data buffer may be a buffer with multiple read ports and multiple write ports, or may include multiple buffer areas with one read and one write. This is not limited herein.

For the AGU_R, when a data stream is input, a read address of vector data is sent in each clock. After read delays of k clocks, the data reaches a computing unit. Because a read address can be sent in each clock, multiple read operations are performed in a pipeline parallel manner. Therefore, read vector data reaches the compute unit in each clock. Each AGU corresponds to a data stream. For example, an AGU corresponds to a data stream of a tensor A, and another AGU corresponds to a data stream of a tensor B. Data read and write supports a read mode in which data in a window is sequentially accessed within a count range according to a stride parameter, and supports a read mode in which data in a window is read from right to left and from bottom to top. A read sequence is not limited herein. Sliding window-based operations (for example, depthwise convolution (DepthwiseCov), maximum pooling (MaxPool), average pooling (AvgPool), and upsampling) support repeated reading of continuous data. Based on depthwise convolution, it is supported that weight data is read sequentially and repeatedly.

Fourth: Multiple Levels of Counters (CNT).

Figure 4:
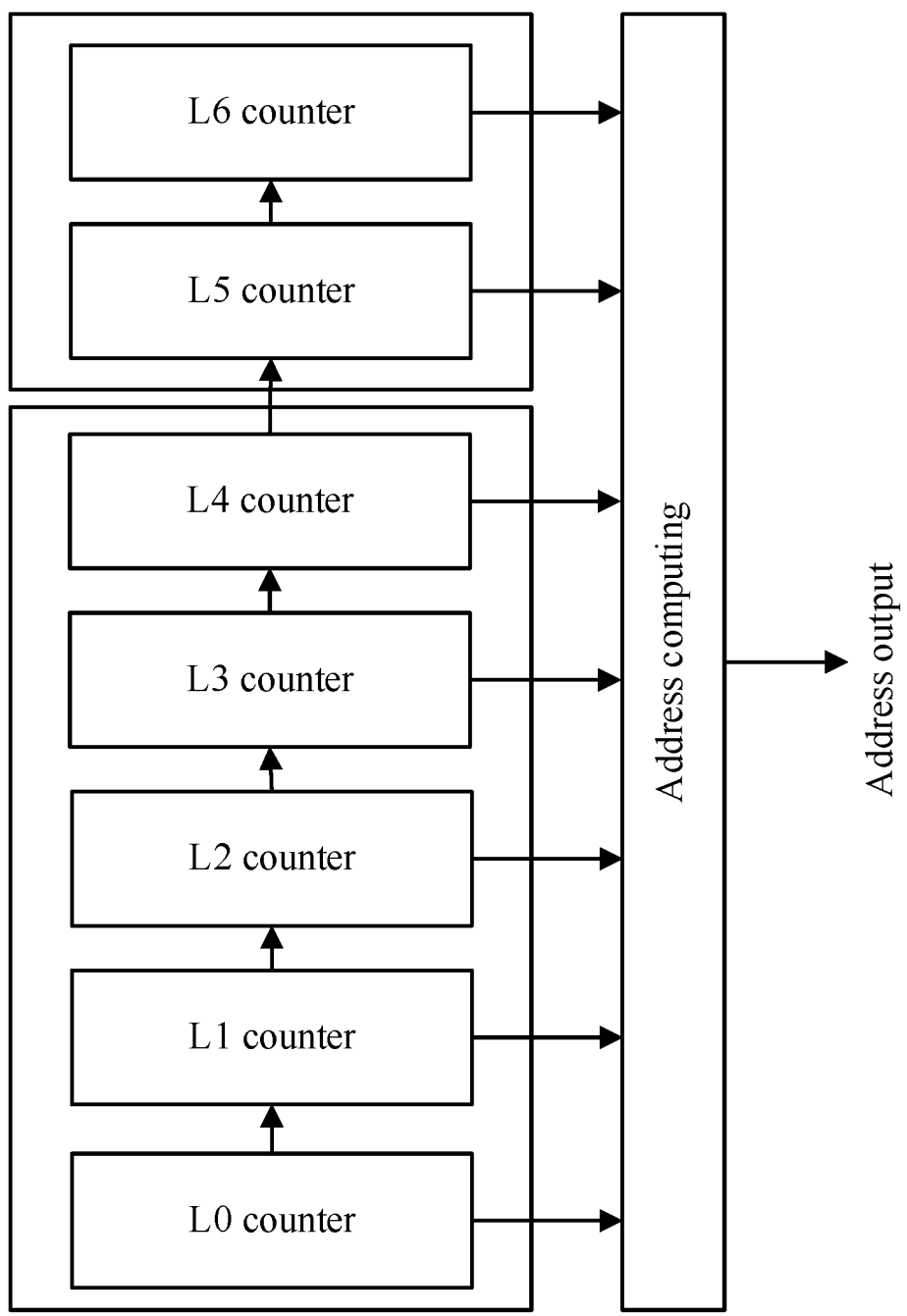
FIG. 4 is a schematic diagram of an embodiment of multiple levels of iterations based on cascaded counters according to embodiments of this application.

The AGU can be formed by cascading multiple levels of CNTs. Each level of CNT uses the same design and is configured with a different parameter in application. For ease of understanding, refer to FIG. 4. FIG. 4 is a schematic diagram of an embodiment of multiple levels of iterations based on cascaded CNTs according to embodiments of this application. As shown in FIG. 4, multiple levels of CNTs are connected in series, that is, L0_CNT is cascaded to L6_CNT. When a count of a lower level of CNT reaches an upper limit, a carry operation is performed on a higher level of CNT. At the same time, a currently outputted count is updated. Specifically, an L0 count represents a count of a vector loop, an L1 count represents a count of a window width loop, an L2 count represents a count of a window height loop, an L3 count represents a count of a feature map width loop, an L4 count represents a count of a feature map height loop, an L5 count represents a count of a slice loop, and an L6 count represents a count of a batch loop. The L5 count and the L6 count are the control part, while the L0 count to the L4 count are a loop invoked once, that is, the L0 count to the L4 count are invoked once and then a carry operation is performed on the L5 count. After the L0 count ends, a read address is sent to the data buffer. If a depth count in the L0 count is disabled, each AGU sends a read address to the data buffer, so that the ALU obtains corresponding data from the read address during operation.

Each of L0_CNT to L6_CNT corresponds to a level. In subsequent embodiments, a level can be understood as a "loop", that is, a level corresponds to a loop.

It should be understood that deep learning processors are widely used in the field of artificial intelligence (AI). AI is a theory, a method, a technology, and an application system that use digital computers or machines controlled by digital computers to simulate, extend, and expand human intelligence, perceive the environment, and obtain knowledge and use knowledge to obtain the best results.

In practical application, a tensor can be stored and processed on a server side or a terminal device side. When a data volume is large, a tensor can also be processed and stored on a cloud server side. The server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The terminal device may be a smartphone, a tablet computer, a notebook computer, a desktop computer, a smart speaker, a smart watch, or the like, but is not limited thereto. The terminal and the server may be directly or indirectly connected in a wired or wireless communication manner. This is not limited in this application.

Figure 5:
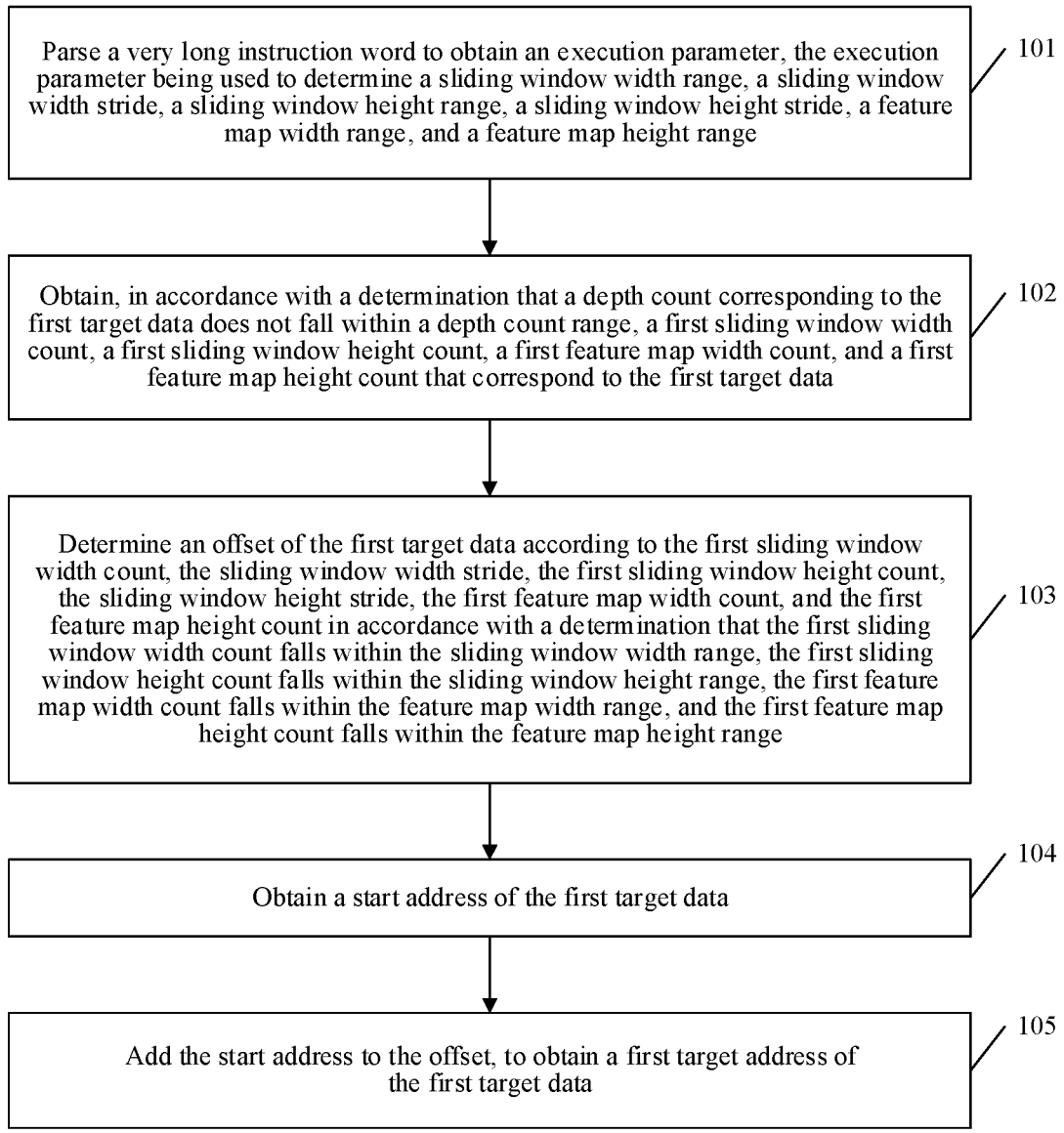
FIG. 5 is a schematic diagram of an embodiment of an address generation method according to embodiments of this application.

With reference to the foregoing descriptions, the following describes an address generation method in this application. FIG. 5 is a schematic diagram of an embodiment of an address generation method according to embodiments of this application. As shown in FIG. 5, an embodiment of the address generation method in the embodiments of this application includes:

101: An AGU parses a very long instruction word (VLIW) to obtain an execution parameter. The execution parameter is used to determine a sliding window width range, a sliding window width stride, a sliding window height range, a sliding window height stride, a feature map width range, and a feature map height range.

In this embodiment, the AGU may parse the VLIW to obtain the execution parameter. VLIW refers to instruction set architectures designed to exploit instruction level parallelism. The VLIW has a simple structure. Therefore, the VLIW can improve parsing efficiency, thereby improving the efficiency of obtaining the execution parameter.

Specifically, the execution parameter includes a counter start (cnt_start) (e.g., a start value of counting), a counter end (cnt_end) (e.g., an end value of counting), a counter stride (cnt_stride) (e.g., a self-adding step size), and a counter mode (cnt_mode) (e.g., counting mode). The cnt_mode sets a behavior performed when a count reaches or exceeds the counter end. In this application, the cnt_mode includes a loop counter mode and a one-time counter mode. For example, a cnt_mode of a kernel window is the loop counter mode, that is, counting is performed within the kernel window. A cnt_mode of a feature map is the one-time counter mode, that is, after counting of a feature map ends, counting of a next feature map is performed.

After the execution parameter is obtained, the sliding window width range, the sliding window width stride, the sliding window height range, the sliding window height stride, the feature map width range, and the feature map height range may be determined according to the execution parameter. The sliding window width range is denoted as $[l_1\_w\_start, l_1\_w\_end]$, the sliding window width stride is denoted as $l_1\_w\_stride$, the sliding window height range is denoted as $[l_2\_h\_start, l_2\_h\_end]$, the sliding window height stride is denoted as $l_2\_h\_stride$, the feature map width range is denoted as $[l_3\_w\_start, l_3\_w\_end]$, and the feature map height range is denoted as $[l_4\_h\_start, l_4\_h\_end]$.

102: The AGU obtains, in accordance with a determination that a depth count value corresponding to the first target data does not fall within a depth count range (e.g., the depth count value corresponding to the first target data exceeds the depth count range), a first sliding window width count, a first sliding window height count, a first feature map width count, and a first feature map height count that correspond to the first target data.

In this embodiment, the AGU obtains the depth count (vector_cnt) corresponding to the first target data, and determines a vector parallelism (VEP). It can be understood that the VEP may be 8, 16, 32, 64, 128, 256, or $2^n$, where n is a positive integer. In this application, for example, VEP is 128. However, this application is not limited thereto. The vector_cnt in this application starts from 0. If the VEP is 128, the vector_cnt ranges from 0 to 127. The depth count range depends on a start value of the depth count and an end value of the depth count. For example, the start value of the depth count is 4 and the end value of the depth count is 16. In this case, when the vector_cnt exceeds 16, it means that the vector_cnt does not fall within the depth count range.

The first sliding window width count, the first sliding window height count, the first feature map width count, and the first feature map height count are respectively current counts that are output by each loop level of CNT and that correspond to the first target data. If the vector_cnt corresponding to the first target data is less than the VEP at a counting layer L0, it means that the entire counting is not completed for the first target data and no carry operation needs to be performed. Therefore, the first sliding window width count, the first sliding window height count, the first feature map width count, and the first feature map height count that correspond to the first target data continue to be obtained.

Specifically, the width count and the height count can be obtained based on the following formulas:

$$lx\_row\_cnt=lx\_row\_cnt+lx\_h\_stride, lx\_row\_cnt \notin [lx\_h\_start, lx\_h\_end]; \quad (1)$$

$$lx\_col\_cnt=lx\_col\_cnt+lx\_w\_stride, lx\_col\_cnt \notin [lx\_h\_start, lx\_w\_end]; \quad (2)$$

and $$vectorout=current\_vector(vector\_cnt); \quad (3)$$

where x can denote an $x^{th}$ loop, lx_row_cnt can denote a height count of the $x^{th}$ loop, lx_col_cnt can denote a width count of the $x^{th}$ loop, and vectorout can denote a vector_cnt that is currently counted.

For a kernel window, the first sliding window width count ($l_1$_col_cnt) falls within the sliding window width range [$l_1$_w_start, $l_1$_w_end] and the first sliding window height count ($l_2$_row_cnt) falls within the sliding window height range [$l_2$_h_start, $l_2$_h_end]. For a feature map, the first feature map width count ($l_3$_col_cnt) falls within the feature map width range [$l_3$_w_start, $l_3$_w_end], and the first feature map height count ($l_4$_row_cnt) falls within the feature map height range $l_4$_h_start, $l_4$_h_end.

Figure 6B:
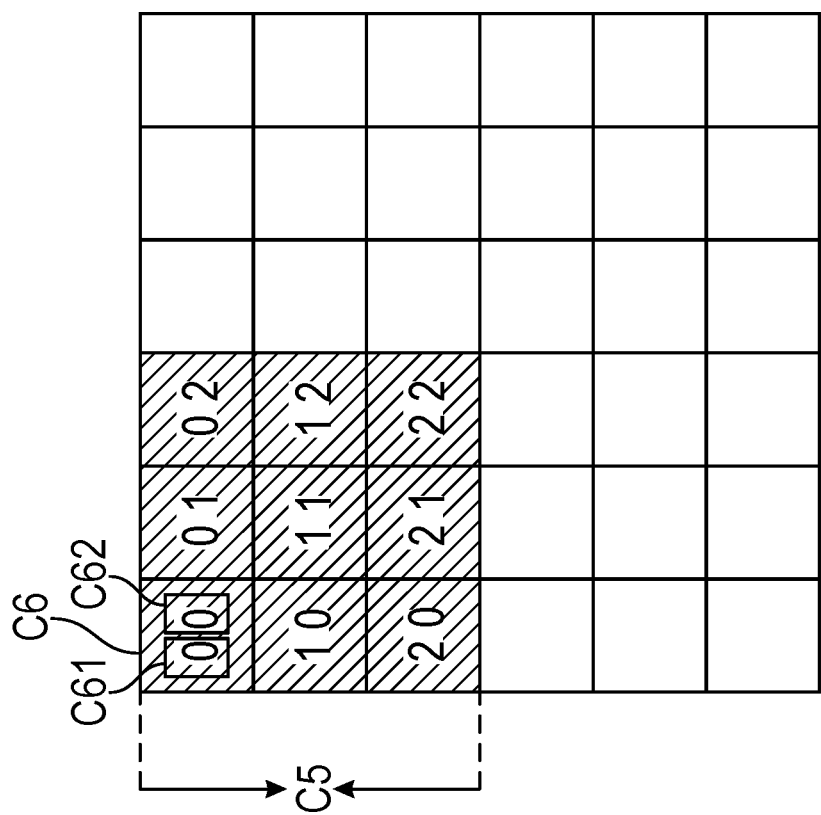
FIG. 6 is a schematic diagram of an embodiment of window-based counting according to embodiments of this application.
Figure 6A:
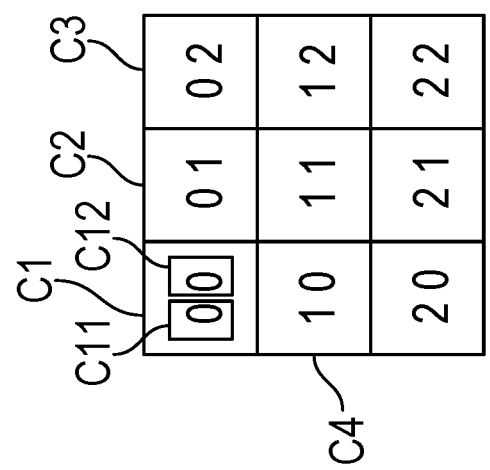

For ease of understanding, refer to FIG. 6. FIG. 6 is a schematic diagram of an embodiment of widow-based counting according to embodiments of this application. As shown in FIG. 6, drawing (A) in FIG. 6 shows one kernel window. One kernel window may include multiple element positions. For example, C1, C2, C3, and C4 are used to indicate different element positions. For example, the first target data is stored in an element position indicated by C1. C11 indicates the height count value of the first sliding window, and C12 indicates the first sliding window width count. Therefore, for the element position indicated by C1, the first sliding window height count is 0, and the first sliding window width count is 0. Drawing (B) in FIG. 6 shows one feature map. A feature map can include multiple kernel windows. C5 indicates one kernel window in the feature map. For example, the first target data is stored in an element position indicated by C6. For the element position C6, in the feature map, C61 indicates the height count value of the first feature map, and C62 indicates the width count value of the first feature map. For the feature map, the first feature map height count C61 is 0, and the first feature map width count C62 is 0.

103: The AGU determines an offset of the first target data according to the first sliding window width count, the sliding window width stride, the first sliding window height count, the sliding window height stride, the first feature map width count, and the first feature map height count in accordance with a determination that the first sliding window width count falls within the sliding window width range, the first sliding window height count falls within the sliding window height range, the first feature map width count falls within the feature map width range, and the first feature map height count falls within the feature map height range.

In this embodiment, the AGU can determine whether the obtained width counts are within the width range and whether the obtained height counts are within the height range. In accordance with a determination that the first sliding window width count falls within the sliding window width range, the first sliding window height count falls within the sliding window height range, the first feature map width count falls within the feature map width range, and the first feature map height count falls within the feature map height range, it indicates that no carry operation needs to be performed for the counts. Therefore, the offset of the first target data may be determined based on the following formulas:

$$col\_cnt=l1\_col\_cnt+l3\_col\_cnt; \quad (4)$$

$$row\_cnt=l2\_row\_cnt+l4\_row\_cnt; \quad (5)$$

$$\text{offset}=row\_cnt*row\_gap+col\_cnt*col\_gap; \quad (6)$$

where l1_col_cnt can denote a sliding window width count such as the first sliding window width count, l3_col_cnt can denote a feature map width count such as the first feature map width count, l2_col_cnt can denote a sliding window height count such as the first sliding window height count, l4_col_cnt can denote a feature map height count such as the first feature map height count, row_gap can denote a row gap coefficient, col_gap can denote a column gap coefficient, the column gap coefficient indicates a gap between physical addresses of two pieces of data that are logically in the same row and in adjacent columns, and can denote an offset such as the offset of the first target data.

Specifically, the row gap coefficient is a gap between physical addresses of data at the start of two adjacent rows in horizontal indexes in the memory, and the column gap coefficient is a gap between physical addresses of two adjacent pieces of data in vertical indexes in the memory.

104: The AGU obtains a starting address of the first target data.

In this embodiment, a base address, a slice count, and a batch count corresponding to the first target data can be obtained first, and the base address, the slice count, and the batch count are all configuration parameters obtained by parsing the very long instruction word (VLIW).

Specifically, the starting address of the first target data may be obtained based on the following formula:

$$start\_addr=base\_addr+slice\_cnt*slice\_incr+batch\_cnt*batch\_incr; \quad (7)$$

where start_addr denotes the starting address of the first target data, base_addr denotes the base address corresponding to the first target data, slice_cnt denotes the slice count corresponding to the first target data, slice_incr denotes a slice address increment corresponding to the first target data, batch_cnt denotes the batch count corresponding to the first target data, and batch_incr denotes a batch address increment corresponding to the first target data.

105: The AGU adds the starting address and the offset to obtain a first target address of the first target data.

In this embodiment, the AGU can add (e.g., sum) the starting address and the offset according to the offset and the starting address, to obtain the first target address of the first target data.

Specifically, the first target address of the first target data is obtained based on the following formula:

$$addr=start\_addr+offset; \quad (8)$$

where addr can denote the first target address of the first target data, that is, an address output to the memory, start_addr can denote the starting address of the first target data, and offset can denote the offset of the first target data.

Specifically, a core operation of a computing unit is ALU. For a tensor operation with multiple batches, there are usually 6 layers of loops. Depthwise convolution performed by a computing unit is used as an example. Execution code is as follows:

```
//an operand A is a three-dimensional tensor, size (A)=[NTI, HTI, WTI, CI]
//an operand K is a three-dimensional tensor, size (K)=[1, HK, WK, CI]
//an output result B is a three-dimensional tensor, size (B)=[NTI, HTO, WKO, CI]
    for (i_NTI=0; i_NTI < NTI; i_NTI++)            //batch loop
      for (i_CI=0; i_CI<CI; i_CI++)                //channel loop
        for (i_HTI=0; i_HTI<HTI; i_HTI++)          //input height loop
          for (i_WTI=0; i_WTI < WTI; i_WTI++)      //input width loop
            for (i_HK=0; i_HK<HK; i_HK++)          // kernel loop on x
              for (i_WK=0; i_WK<WK; i_WK++)        //kernel loop on y
                B[i_NTI][i_HTI/HStride][i_WTI/WStride][i_CI]+=
K[i_HK][i_WK][i_CI]*A[i_NTI][i_HTI+i_HK][i_WTI+I_WK][i_CI];
        //add bias
        B[i_NTI][i_HTI/HStride][i_WTI/WStride][i_CI]+=bias[i_CI].
```

N denotes a batch, T denotes a tensor, I denotes an input, O denotes an output, W denotes a width, H denotes a height, and K denotes a convolution kernel.

In the computing unit, if the VEP is 128, it means that cutting is further performed at a unit of 128. Execution code is as follows. L0 loop implements a vector operation of a 128 element. The operation can be performed in parallel. Therefore, 6 layers of loop parameters are configured for execution of the computing unit, that is, one instruction may be used for execution:

```
//an operand A is a three-dimensional tensor, size (A)=[NTI, HTI, WTI, CI]
//an operand K is a three-dimensional tensor, size (K)=[1, HK, WK, CI]
//an output result B is a three-dimensional tensor, size (B)=B[NTI, HTO, WKO, CI]
//Vector Engine parallelism Vep=128
    for (i_NTI=0; i_NTI < NTI; i_NTI++)                 // L6
      for (i_CI=0; i_CI<ceil(CI/VEP); i_CI++)           // L5
        for (i_HTI=0; i_HTI<HTI; i_HTI++)               // L4
          for (i_WTI=0; i_WTI < WTI; i_WTI++)           // L3
            for (i_HK=0; i_HK<HK; i_HK++)               // L2
              for (i_WK=0; i_WK<WK; i_WK++)             // L1
                for (i_VEP=0; i_VEP<VEP; i_VEP++)       // L0
                  B[i_NTI][i_HTI/HStride][i_WTI/WStride][i_CI*VEP+i_VEP]+=
K[i_HK][i_WK][i_CI]*A[i_NTI][i_HTI+i_HK][i_WTI+I_WK] [i_CI*VEP+i_VEP];
        //add bias
    B[i_NTI][i_HTI/HStride][i_WTI/WStride][i_CI*VEP+i_VEP]+=bias[i_CI*VEP+i_VEP].
```

N denotes a batch, T denotes a tensor, I denotes an input, O denotes an output, W denotes a width, H denotes a height, K denotes a convolution kernel, L6 denotes a batch loop, L5 denotes a channel loop, L4 denotes an input height loop, L3 denotes an input width loop, L2 denotes a kernel loop in the x direction, L1 denotes a kernel loop in the y direction, and L0 denotes a vector loop. In an SIMD operation unit with a parallelism VEP, a for loop corresponding to L0 is processed in parallel in an ALU.

As can be seen from the above code, two parts need to be configured for the operation of the ALU in the computing unit: a loop part and an operation part. The loop part needs to implement sequential reading of data in multiple "for loops" and sequential writing of results. Therefore, in addition to supporting the 6 layers of loops in the foregoing example, an index in a vector can also be supported. Therefore, the computing unit supports 7 layers of "for loops" that correspond to loops of an index in a vector, a width of a kernel window, a height of a kernel window, a width of a feature map, a height of a feature map, a dimension of a channel, and a dimension of a batch. These parameters correspond to a parameter configuration of the AGU. The operation part needs to configure an execution sequence and an operation method of a numerical operation of a tensor. The depthwise convolution is used as an example again. For data of each window, the corresponding vectors of the two operands are multiplied first, and then result vectors are accumulated. Therefore, two data sources corresponding to an AGU_R need to be configured, and two tensors are read into a computing unit such as an ALU. After all multiplication and addition operations in the window are performed, an obtained operation result is written back by an AGU_W for writing back data.

Embodiments of this application provide an address generation method. In the foregoing manner, based on a computing characteristic of a tensor, corresponding execution parameters are configured for the tensor in different dimensions such as a depth, a sliding window, and a feature map. A target address corresponding to data is computed according to the execution parameters and counts of data in different dimensions such as a depth, a sliding window, and a feature map. In this way, data is read sequentially on the inputted tensor, thereby improving data access efficiency.

In some embodiments, based on the embodiment corresponding to FIG. 5, in an embodiment of the address generation method provided in the embodiments of this application, the determining an offset of the first target data according to the first sliding window width count, the sliding window width stride, the first sliding window height count, the sliding window height stride, the first feature map width count, and the first feature map height count may include:

adding the first sliding window width count value to the sliding window width stride (e.g., sliding window width step size), to obtain a second sliding window width count value;

adding the first sliding window height count value to the sliding window height stride (e.g., sliding window height step size), to obtain a second sliding window height count;

adding the second sliding window width count to the first feature map width count, to obtain a width count;

adding the second sliding window height count to the first feature map height count, to obtain a height count; and adding a product result of the height count and a row gap coefficient to a product result of the width count and a column gap coefficient, to obtain the offset of the first target data.

In this embodiment, a method for determining the offset of the first target data is described. The offset of the first target data can be determined based on formula (4) to formula (6) in the foregoing embodiment. The width count is calculated based on formula (4), the height count is calculated based on formula (5), and the offset of the first target data is calculated based on formula (6).

Figure 7:
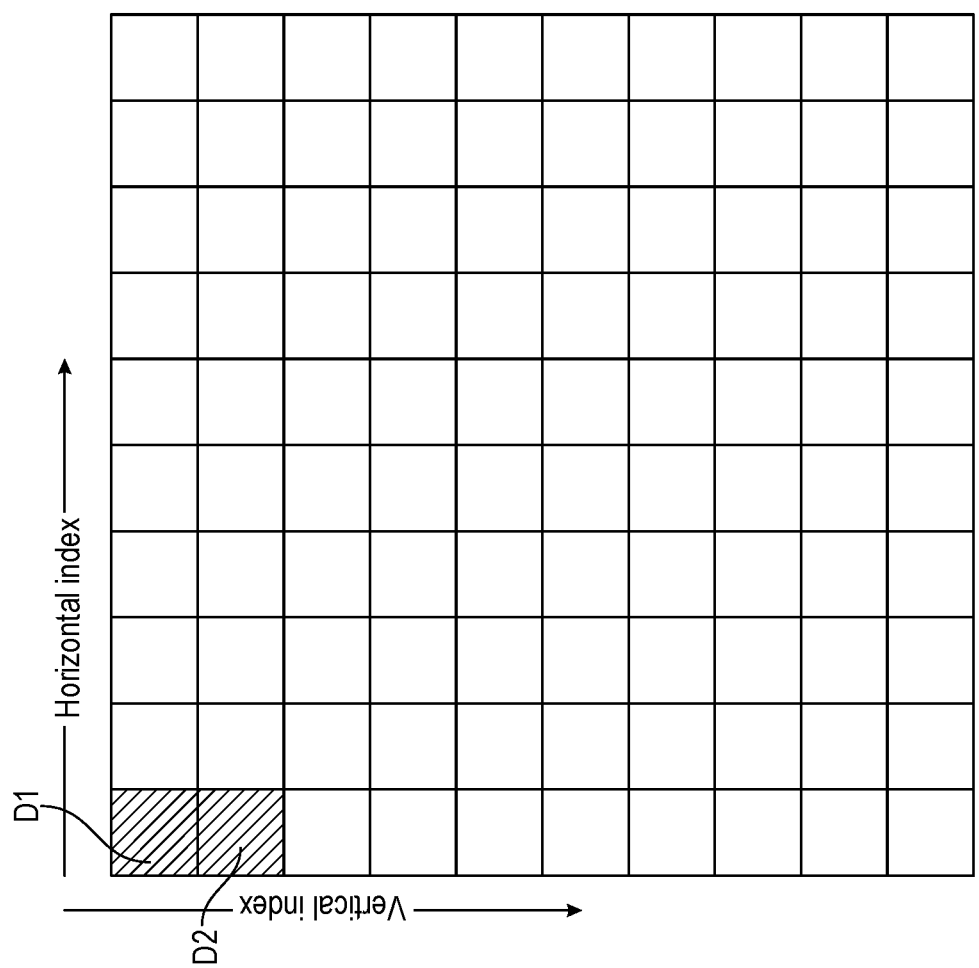
FIG. 7 is a schematic diagram of an embodiment of a row gap coefficient according to embodiments of this application.

Specifically, the row gap coefficient is a gap between physical addresses of data at the start of two adjacent rows in horizontal indexes in the memory, and the column gap coefficient is a gap between physical addresses of two adjacent pieces of data in vertical indexes in the memory. For ease of understanding, refer to FIG. 7. FIG. 7 is a schematic diagram of an embodiment of a row gap coefficient according to embodiments of this application. As shown in FIG. 7, D1 denotes an element position in a window and D2 denotes an element position adjacent to D1. Therefore, when a column gap coefficient is 1, a row gap coefficient between the element position D1 and the element position D2 is 10. Assuming that a size of a slice is 32*32*1024 and a quantity of channels is 128, if data is stored continuously, the column gap coefficient is 1.

For example, the first sliding window width count ($l_1\_col\_cnt$) is 0 (0∈(0, 2)), the first sliding window height count ($l_2\_row\_cnt$) is 0 (0∈(0, 2)), the first feature map width count ($l_3\_col\_cnt$) is 5 (5∈(0, 9)), the first feature map height count ($l_4\_row\_cnt$) is 5 (5∉(lx_w_stride) (0, 9)), the sliding window width step (lx_h_stride) is 1, the sliding window height step (row_gap) is 1, the row gap coefficient (col_gap) is 10, and the column gap coefficient is 1.

The first sliding window width count is added to the sliding window width stride based on formula (2), that is, a second sliding window width count ($l_1\_col\_cnt$)=0+1=1.

The first sliding window height count is added to the sliding window height stride based on formula (1), that is, a second sliding window height count ($l_2\_row\_cnt$)=0+1=1.

the second sliding window width count is added to the first feature map width count based on formula (4), that is, a width count (col_cnt)=1+5=6.

the second sliding window height count is added to the first feature map height count based on formula (3), that is, a height count (row_cnt)=1+5=6.

A product result of the height count and a row gap coefficient is added to a product result of the width count and a column gap coefficient based on formula (6), that is, the offset (offset) of the first target data=6*10+6*1=66.

The foregoing example is only an illustration. In actual computing, processing is performed according to specific numerical values.

In this embodiment of this application, the method for determining the offset of the first target data is provided. The method provides a feasible method for implementing the solution, thereby improving feasibility and operability of the solution.

In some embodiments, based on the embodiment corresponding to FIG. 5, in another embodiment of the address generation method provided in the embodiments of this application, the obtaining a starting address of the first target data may include:

obtaining a base address corresponding to the first target data, where the base address is a configuration parameter obtained by parsing the very long instruction word;

obtaining a slice count and a batch count that correspond to the first target data;

adding a product result of the slice count and a slice address increment to a product result of the batch count and a batch address increment, to obtain a total address increment, where both the slice address increment and the batch address increment are configuration parameters obtained by parsing the very long instruction word; and adding the total address increment to the base address, to obtain the starting address of the first target data.

In this embodiment, a method for obtaining the starting address of the first target data is described. First, the very long instruction word is parsed to obtain a configuration parameter. The configuration parameter includes a base address (base_addr), a slice address increment (slice_incr), and a batch address increment (batch_incr). The base address is an address corresponding to the first data in a tensor of the first target data, the slice address increment is an address increment (an increased physical address) obtained after the slice is increased, and the batch address increment is an address increment (an increased address space) obtained after the batch is increased. Therefore, the slice count and the slice address increment may be multiplied based on formula (7) in the foregoing embodiment, to obtain a corresponding product result (slice_cnt*slice_incr). In addition, the batch count and the batch address increment are multiplied, to obtain a corresponding product result (batch_cnt*batch_incr). Further, the two product results are added to obtain the total address increment (slice_cnt*slice_incr+batch_cnt*batch_incr). Finally, the total address increment is added to the base address, to obtain the starting address (start_addr) of the first target data.

For ease of understanding, for example, base_addr corresponding to the first target data is A, slice_cnt corresponding to the first target data is 4 batch_cnt, corresponding to the first target data is 1, slice_incr corresponding to the first target data is 1024, and batch_incr corresponding to the first target data is 8192. In this case, it may be obtained that slice_cnt*slice_incr is 4096 and batch_cnt*batch_incr is 8192. The two product results are added to obtain 12288, and then it may be obtained that start_addr of target data is A+12288.

In this embodiment of this application, a method for obtaining the start address of the first target data is provided. In the method, the start address corresponding to the data can be obtained through computing, thereby improving feasibility of this solution.

In some embodiments, based on the embodiment corresponding to FIG. 5, in another embodiment of the address generation method provided in the embodiments of this application, the address generation method may further include:

performing a carry operation on the first sliding window width count and performing reset processing on the depth count in accordance with the determination that the depth count corresponding to the first target data does not fall within the depth count range.

In this embodiment, a method for performing a carry operation based on the vector_cnt is described. When the vector_cnt corresponding to the first target data is greater than or equal to the depth counter end, it means that counting has been completed for a vector. Therefore, a carry operation may be performed on a next vector.

For ease of understanding, for example, the depth counter termination end value is 128. If the vector_cnt is 0, it means that the first target data is at the start position, and if the vector_cnt is 127, it means that the first target data is at the end position. If the vector_cnt is 128, it is, the first target data is no longer in the sliding window. Therefore, a carry operation needs to be performed on the first sliding window width count, and reset processing needs to be performed on the vector_cnt, that is, the first sliding window width count is reset to cnt_start. Because a carry operation is already performed on the first sliding window width count, the vector_cnt also needs to be reset to cnt_start. Similarly, when the vector_cnt exceeds a boundary value, the first sliding window width count is accumulated by 1, that is, is 2. The vector_cnt is 0 after reset processing. The boundary value denotes a counter end (cnt_end). If the counter start (cnt_start) is greater than the counter end (cnt_end), the boundary value is the lower limit of the counter end (cnt_end), that is, when the vector_cnt is less than or equal to the counter end (cnt_end), it indicates that a boundary condition is exceeded. If the counter start (cnt_start) is less than the counter end (cnt_end), the boundary value is the upper limit of the counter end (cnt_end), that is, when the vector_cnt is greater than or equal to the counter end (cnt_end), it means that the boundary condition is exceeded.

It can be understood that the depth counter end may be another value. The foregoing example is only used to understand this solution. In practical application, a method for performing a carry operation on the first sliding window width count and performing reset processing on the vector_cnt is determined flexibly according to the actual value of the depth counter end.

In this embodiment of this application, a method for performing a carry operation based on the vector_cnt is provided. In the method, it is determined whether the vector_cnt is greater than or equal to the depth counter end, to determine whether to perform a carry operation. In addition, when the carry condition is satisfied, a carry operation is performed on the first sliding window count and the vector_cnt is set to zero. Therefore, a subsequent operation can be performed smoothly, thereby improving implementability of this solution.

In some embodiments, based on the embodiment corresponding to FIG. 5, in another embodiment of the address generation method provided in the embodiments of this application, the execution parameter is further used to determine a feature map width stride; and the address generation method may further include:

performing a carry operation on the first sliding window height count and performing reset processing on the first sliding window width count in accordance with a determination that the first sliding window width count does not fall within the sliding window width range and the first sliding window height count falls within the sliding window height range; or performing a carry operation on the first feature map width count and performing reset processing on the first sliding window width count, the first sliding window height count, and the depth count in accordance with a determination that the first sliding window width count does not fall within the sliding window width range and the first sliding window height count does not fall within the sliding window height range; where the performing a carry operation on the first feature map width count may include:

adding the first feature map width count to the feature map width stride, to obtain a second feature map width count.

In this embodiment, a method for performing a carry operation on a sliding window is described. For a sliding window, it may be determined whether the first sliding window width count falls within the sliding window width range, and whether the first sliding window height count falls within the sliding window height range. This specifically includes three cases.

In a first case, the first sliding window width count falls within the sliding window width range, and the first sliding window height count also falls within the sliding window height range. In this case, no carry operation needs to be performed. The first target address may be obtained through the method provided in the foregoing embodiment. Details are not repeated herein.

In a second case, the first sliding window width count does not fall within the sliding window width range, but the first sliding window height count falls within the sliding window height range. In a third case, the first sliding window width count does not fall within the sliding window width range, and the first sliding window height count does not fall within the sliding window height range. Both the second case and the third case require a carry operation. Therefore, the two cases are described below respectively.

Figure 8:
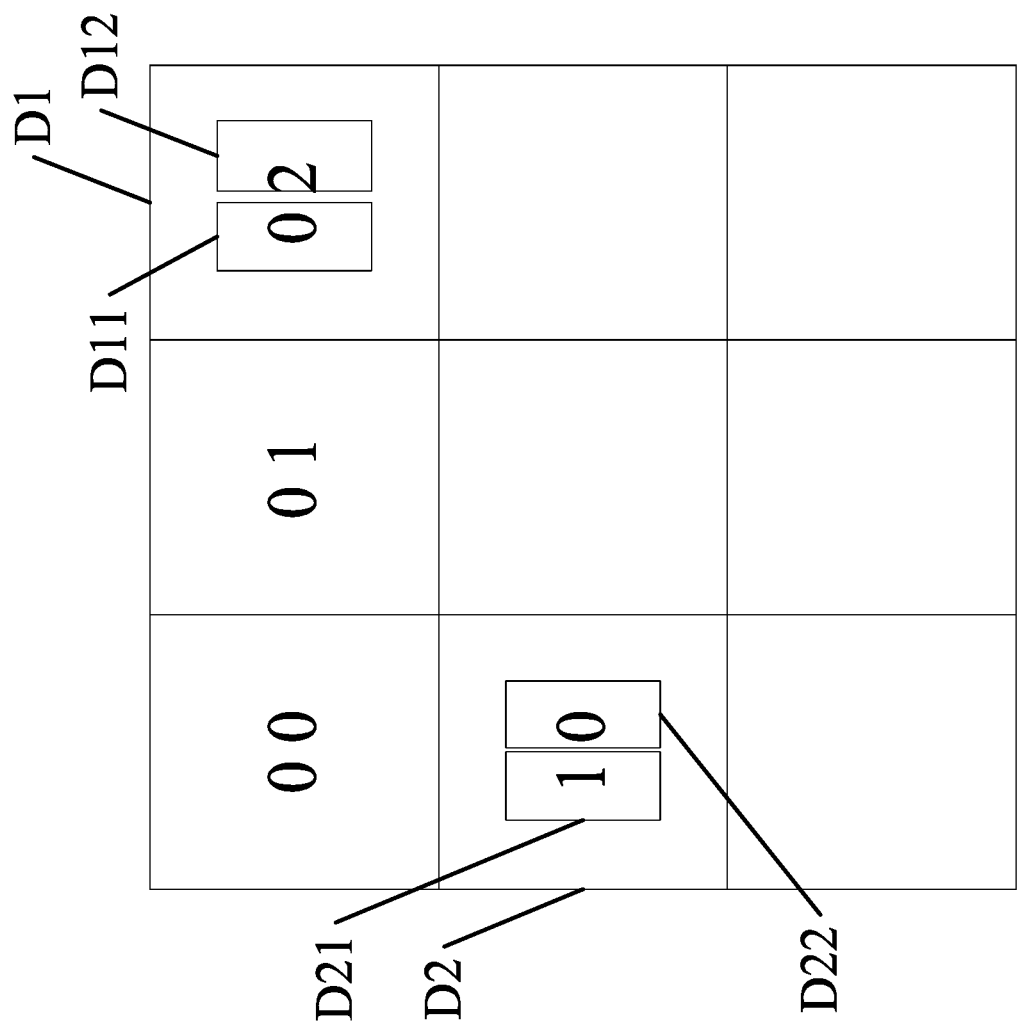
FIG. 8 is a schematic diagram of an embodiment of performing a carry operation on a sliding window according to embodiments of this application.

In the second case, the first sliding window width count does not fall within the sliding window width range, but the first sliding window height count falls within the sliding window height range. Therefore, counting of the first target data has been completed in the horizontal direction of the sliding window, but counting has not been completed in the vertical direction of the sliding window. Therefore, a carry operation needs to be performed in the vertical direction, that is, the first sliding window height count may be added to the sliding window height stride, to obtain a second sliding window height count. If the sliding window height stride is 1, the first sliding window height count is increased by 1. In addition, reset processing is performed on the first sliding window width count, that is, the first sliding window width count is reset to cnt_start. For example, the sliding window width range is [0, 2] and the sliding window height range is [0, 2]. FIG. 8 is a schematic diagram of an embodiment of performing a carry operation on a sliding window according to embodiments of this application. As shown in FIGS. 8, D1 and D2 both denote element positions. For the element position D1, D11 denotes the first sliding window height count, and D12 denotes the first sliding window width count. When a carry operation is performed on the first sliding window width count, it means that the first sliding window width count does not fall within the sliding window width range [0, 2]. Therefore, the first sliding window height count needs to be increased to 1, and the first sliding window width count needs to be reset to cnt_start. D21 denotes a second sliding window height count (that is, 1) obtained after the carry operation, and D22 denotes the first sliding window width count (that is, 0) obtained after reset.

In the third case, because the first sliding window width count does not fall within the sliding window width range, and the first sliding window height count does not fall within the sliding window height range. Therefore, counting of the first target data in both the horizontal direction and the vertical direction of the sliding window has been completed, and a carry operation may be performed on the kernel window level. To be specific, the first feature map width count needs to be added to the feature map width stride, to obtain the second feature map width count, and the first sliding window width count, the first sliding window height count, and the depth count are reset, that is, reset to cnt_start. Then, operations in the foregoing embodiments are repeated in the kernel window.

In this embodiment of this application, a method for performing a carry operation on a sliding window is provided. In the method, for the sliding window level, different carry methods are used in different cases, thereby improving selectivity and diversity of this solution.

In some embodiments, based on the embodiment corresponding to FIG. 5, in another embodiment of the address generation method provided in the embodiments of this application, the execution parameter is further used to determine a feature map height stride; and the address generation method may further include:

performing a carry operation on the first feature map width count and performing reset processing on the first feature map width count in accordance with a determination that the first feature map width count does not fall within the feature map width range;

performing a carry operation on the first feature map height count and performing reset processing on the first feature map height count in accordance with a determination that the first feature map height count does not fall within the feature map height range; and performing a carry operation on a slice count and performing reset processing on the first sliding window width count, the first sliding window height count, the first feature map width count, the first feature map height count, and the depth count in accordance with a determination that the first feature map height count does not fall within the feature map height range; where the performing a carry operation on the first feature map height count may further include the following step:

adding the first feature map height count to the feature map height stride, to obtain a second feature map height count.

In this embodiment, a method for performing a carry operation on a feature map is described. For a feature map level, it may be determined whether the first feature map width count falls within the feature map width range, and whether the first feature map height count falls within the feature map height range. This may include three cases.

In a first case, the first feature map width count falls within the feature map width range, and the first feature map height count also falls within the feature map height range. That is, in the first case, no carry operation needs to be performed. The first target address may be obtained through the method provided in the foregoing embodiment. Details are not repeated herein.

In a second case, the first feature map width count does not fall within the feature map width range, but the first feature map height count falls within the feature map height range. In a third case, the first feature map width count does not fall within the feature map width range, and the first feature map height count does not fall within the feature map height range. Both the second case and the third case require a carry operation. Therefore, the two cases are described below respectively.

In the second case, the first feature map width count does not fall within the feature map width range, but the first feature map height count falls within the feature map height range. Therefore, it may be learned that counting of the first target data has been completed in the horizontal direction of the feature map, but counting has not been completed in the vertical direction of the feature map. Therefore, a carry operation needs to be performed in the vertical direction, that is, the first feature map height count may be added to the feature map height stride, to obtain a second feature map height count. If a carry operation is performed on the first feature map height count, reset processing is performed on the first feature map width count, that is, the first feature map width count is reset to cnt_start.

In the third case, the first feature map width count does not fall within the feature map width range, and the first feature map height count does not fall within the feature map height range. Therefore, it may be learned that counting of the first target data has been completed in both the horizontal direction and the vertical direction of the feature map, that is, counting has been completed at the feature map level, and a carry operation can be performed on the slice level. In this application, for example, one is added to the slice level. Then, the first sliding window width count, the first sliding window height count, the first feature map width count, the first feature map height count, and the depth count are reset, that is, are all reset to cnt_start. For example, the feature map height range is [0, 8]. After a carry operation is performed on the first feature map width count, the first feature map height count is added to the feature map height stride to obtain 9. In this case, the carry condition is satisfied. Therefore, the first sliding window width count, the first sliding window height count, the first feature map width count, the first feature map height count, and the depth count all need to be reset to cnt_start, and a carry operation is performed on a slice count.

In this embodiment of this application, a method for performing a carry operation on a feature map is provided. In the method, for the feature map level, different carry methods are used in different cases, thereby improving selectivity and diversity of this solution.

In some embodiments, based on the embodiment corresponding to FIG. 5, in another embodiment of the address generation method provided in the embodiments of this application, the address generation method may further include:

performing a carry operation on a batch count and performing reset processing on a slice count, the first sliding window width count, the first sliding window height count, the first feature map width count, the first feature map height count, and the depth count in accordance with a determination that the slice count does not fall within a maximum slice value range, where the maximum slice value range is determined according to a tensor depth value and vector parallelism that correspond to the first target data; and performing reset processing on the batch count, the slice count, the first sliding window width count, the first sliding window height count, the first feature map width count, the first feature map height count, and the depth count in accordance with a determination that the batch count is greater than or equal to a maximum batch value, where the maximum batch value is a configuration parameter obtained by parsing the very long instruction word.

In this embodiment, a method for performing a carry operation on a slice and a batch is described, and the maximum slice value needs to be determined according to a tensor depth and a VEP corresponding to the first target data. Specifically, the maximum slice value is an integer. Therefore, the tensor depth is divided by the VEP and a quotient is rounded up to the next integer, to obtain the maximum slice value. For example, if the tensor depth is 256 and the VEP is 128, the maximum slice value can be determined as 2 (that is, 256÷128). If the tensor depth is 300 and the VEP is 128, the maximum slice value can be determined as 3 (that is, 300÷128 and then a quotient is rounded up to the next integer). Therefore, the maximum slice value needs to be flexibly determined based on the actual tensor depth and the actual VEP.

When slice_cnt is greater than or equal to the maximum slice value, it means that counting of all slices has been completed. In this case, a carry operation may be performed on the batch level, and the vector_cnt, the first sliding window width count, the first sliding window height count, the first feature map width count, the first feature map height count, and the slice count are all reset, that is, are all reset to cnt_start. Then, counting of a next tile starts. A specific counting method is similar to that in the foregoing embodiment. Details are not repeated herein.

Assuming that the maximum batch value is 4, when the batch count is greater than or equal to the maximum batch value, the vector_cnt, the first sliding window width count, the first sliding window height count, the first feature map width count, the first feature map height count, the slice count, and the batch_cnt may be reset, that is, are all reset to cnt_start. If there is a next batch, counting of the next batch can be performed in a manner described in the foregoing embodiment. Details are not repeated herein.

In this embodiment of this application, a method for performing a carry operation on a slice and a batch is provided. In the method, a carry operation is performed on the slice level and the batch level, thereby improving feasibility of this solution.

In some embodiments, based on the embodiment corresponding to FIG. 5, in another embodiment of the address generation method provided in the embodiments of this application, after the start address is added to the offset, to obtain the first target address of the first target data, the address generation method may further include:

reading the first target data through a first data channel based on the first target address; and sending the first target data to an arithmetic logical unit through a second data channel; and the address generation method may further include:

when obtaining a second target address of second target data, reading the second target data through a third data channel based on the second target address, where the second target address is a physical address adjacent to (e.g., next to) the first target address; and sending the second target data to the arithmetic logical unit through a fourth data channel.

In this embodiment, a read and write manner in which each piece of data uses a different fetch address is described. In vector read, each piece of data corresponds to one channel and uses one AGU. For example, a VEP is 128. In this case, 128 AGUs need to be used, and each AGU uses a separate set of configuration parameters. In conclusion, AGUs located on different channels can output different addresses and read or write corresponding data.

Figure 9:
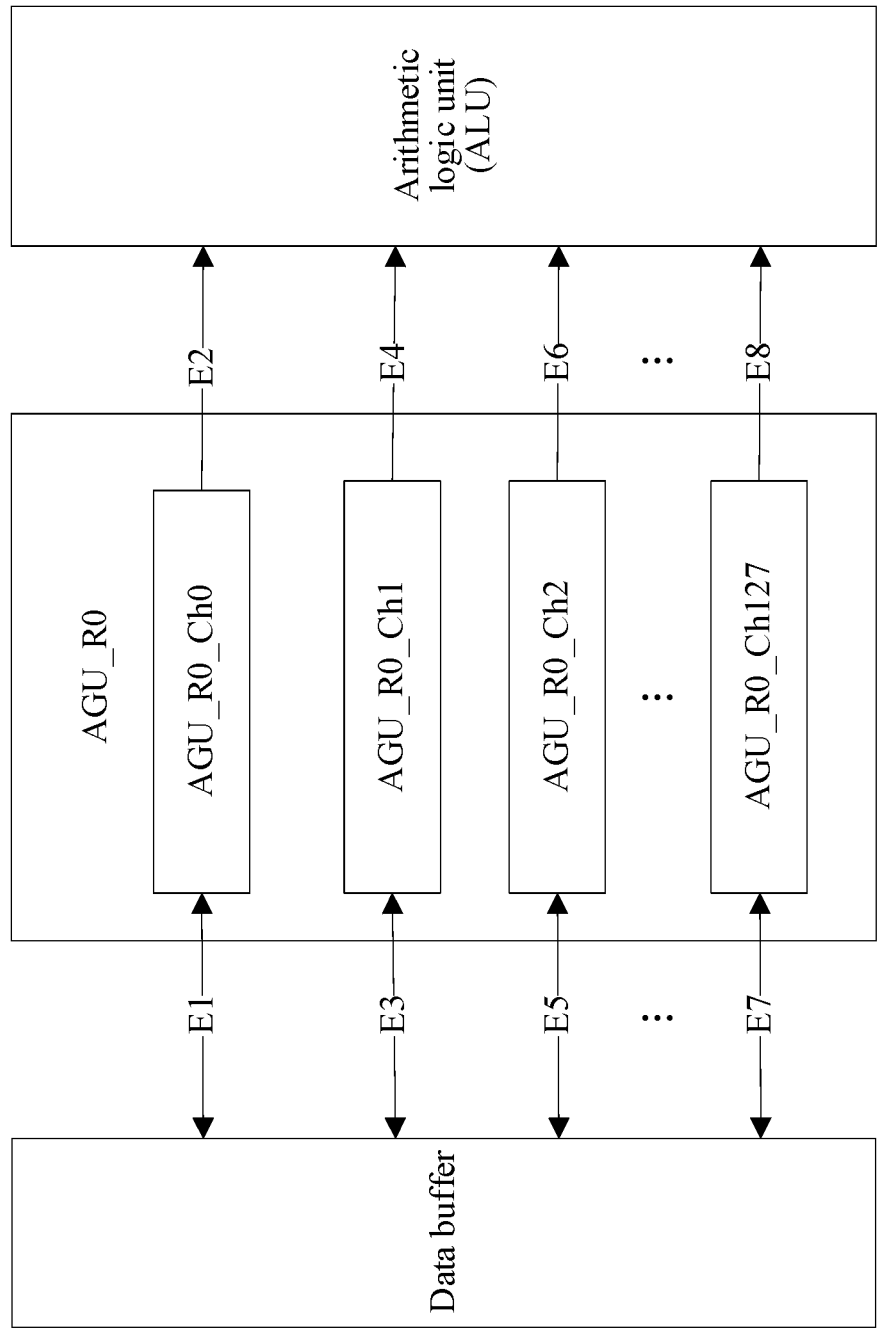
FIG. 9 is a schematic diagram of an embodiment of using different access addresses for data according to embodiments of this application.

For ease of understanding, for example, a VEP is 128. FIG. 9 is a schematic diagram of an embodiment of using different fetch addresses for data in embodiments of this application. As shown in FIG. 9, E1 to E8 all denote channels. After the first target address of the first target data is obtained in an AGU_R0, the first target address can be sent to a data buffer through the channel E1, and the first target data corresponding to the first target address can be read from the data buffer through the channel E1 based on the first target address. Then, the first target data is sent to an ALU through the channel E2. Similarly, after the second target address of the second target data is obtained in an AGU_R0, the second target address can be sent to a data buffer through the channel E3, and the second target data corresponding to the second target address can be read from the data buffer through the channel E3 based on the second target address. Then, the second target data is sent to an ALU through the channel E4. After third target address of third target data is obtained in an AGU_R0, the third target address can be sent to a data buffer through the channel E5, and the third target data corresponding to the third target address can be read from the data buffer through the channel E5 based on the third target address. Then, the third target data is sent to an ALU through the channel E6. By analogy, 128 pieces of data can be read at the same time, and each data is read and written through different channels. It can be understood that the example in FIG. 9 is only used to understand this solution, and in practical application, a specific method for reading and writing data is flexibly determined according to an actual case.

In this embodiment of this application, a read and write method in which each piece of data uses a different fetch address (e.g., access address) is provided. In the method, data is read and sent through different channels, which can support various operations and improve data processing flexibility.

In some embodiments, based on the embodiment corresponding to FIG. 5, in another embodiment of the address generation method provided in the embodiments of this application, after the start address is added to the offset, to obtain the first target address of the first target data, the address generation method may further include:

reading the first target data through a first data channel based on the first target address; and sending the first target data to an arithmetic logical unit through a second data channel; and the address generation method may further include:

when obtaining a second target address of second target data, reading the second target data through the first data channel based on the second target address, where the second target address is a next physical address adjacent to the first target address; and sending the second target data to the arithmetic logical unit through a third data channel.

In this embodiment, a read and write method in which each piece of data uses the same fetch address is described. In a fetch mode at a unit of vector, the entire vector only needs to use one fetch address, that is, one AGU is instantiated to form one vector AGU and one set of parameters can be configured.

Figure 10:
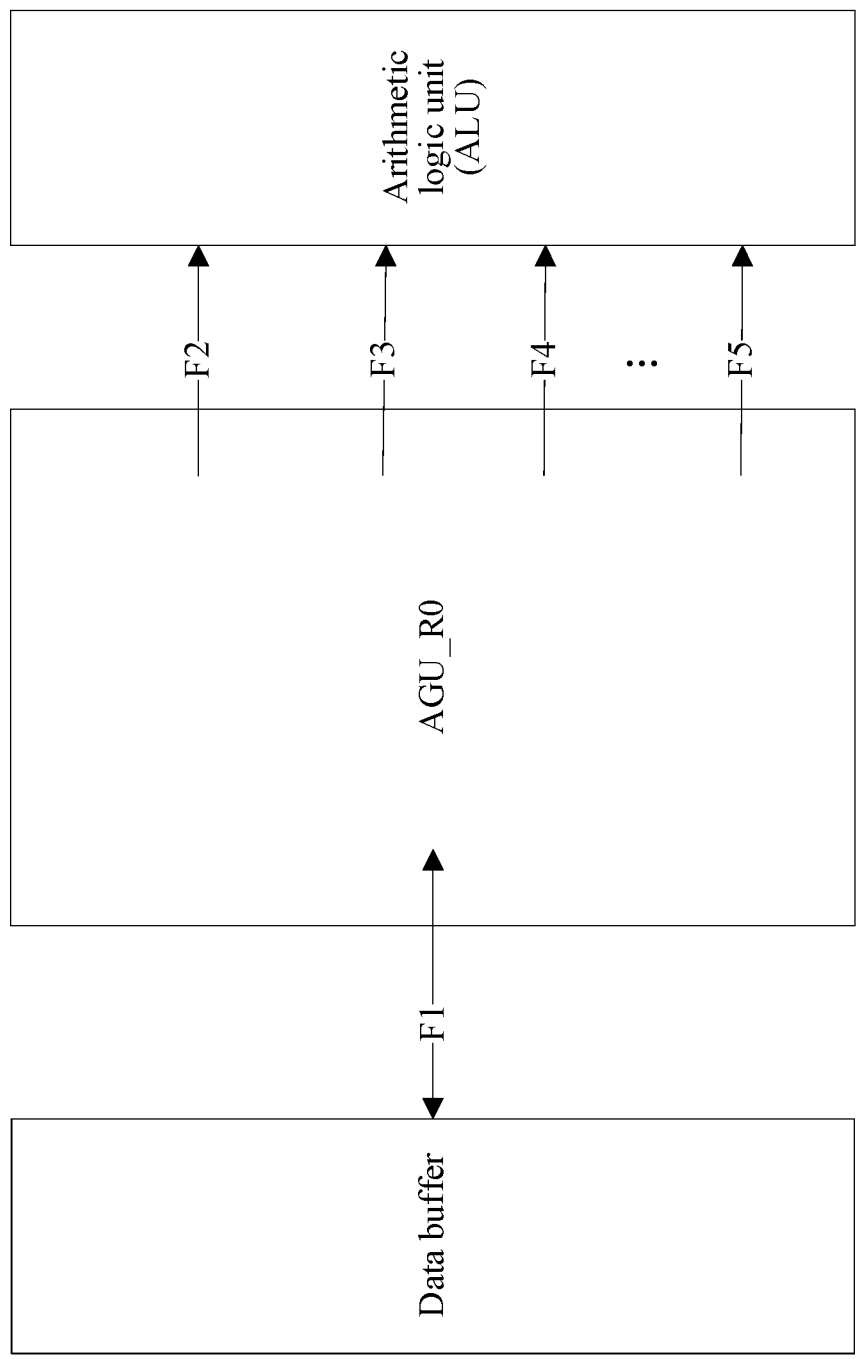
FIG. 10 is a schematic diagram of reading and sending target data according to another embodiment of this application.

For ease of understanding, for example, a VEP is 128. FIG. 10 is a schematic diagram of an embodiment of using the same fetch address for data in embodiments of this application. As shown in FIG. 10, F1 to F5 all denote channels. After the first target address of the first target data is obtained in an AGU_R0, the first target address can be sent to a data buffer through the channel F1, and the first target data corresponding to the first target address can be read from the data buffer through the channel F1 based on the first target address. Then, the first target data is sent to an ALU through the channel F2. Similarly, after the second target address of the second target data is obtained in an AGU_R0, the second target address can still be sent to a data buffer through the channel F1, and the second target data corresponding to the second target address can be read from the data buffer through the channel F1 based on the second target address. Then, the second target data is sent to an ALU through the channel F3. By analogy, after target addresses of 128 pieces of data are obtained, the target addresses are still sent to a data buffer through the channel F1, and the corresponding data can be read from the data buffer through the channel F1 based on the target addresses. Then, the data is sent to an ALU through the channel F5. It can be understood that the example in FIG. 10 is only used to understand this solution, and in practical application, a specific method for reading and sending target data is flexibly determined according to an actual case.

In this embodiment of this application, a read and write method in which each piece of data uses the same fetch address is provided. In the method, data is read through the same channel. In this case, only one AGU needs to be instantiated, that is, one set of parameters are configured, thereby improving parameter configuration efficiency.

Further, the methods for reading and sending target data described in the foregoing embodiments are applicable to target data in one AGU. As shown in FIG. 3, the AGU includes multiple vector AGUs. Therefore, the multiple vector AGUs cooperate in manners that include, but are not limited to, the following four manners:

A first manner is one read and one write, that is, an AGU_R0 and an AGU_W0 run at the same time, AGU_R0 starts first, and a result of an ALU drives the AGU_W0 to start execution.

A second manner is multiple read and one write, that is, multiple AGU_Rx run at the same time and may run in different modes. For example, an AGU_R0 can input one vector in each clock, and an AGU_R1 can output once every multiple clocks. After a vector is read for the first time, an L0_CNT selects and outputs an element in the vector in each clock, and then the element is expanded to a vector through copy for computing. In this case, the coordination manner can support two read and one write.

A third manner is one read and multiple write, that is, one channel of input produces multiple results and multiple AGU_Wxs write back the multiple results.

A fourth manner is multiple read and multiple write, that is, multiple channels of inputs are inputted by multiple AGU_Rxs, multiple results are generated after computing, and multiple AGU_Wxs write back the multiple results.

It can be understood that other cooperation manners may also be included in practical application, and a specific cooperation manner needs to be flexibly determined according to an actual requirement. FIG. 3 shows the multiplex design idea, and one architecture is invoked for multiple times, for example, multiple CNT modules are invoked in one AGU and multiple vector AGU_Rs and vector AGU_Ws are invoked in one computing unit. Although a quantity of modules in design is large, during debugging and function verification, only a basic CNT module and a basic AGU need to be verified. This can reduce design and verification workload and improve verification efficiency. Each AGU_Rn or AGU_Wn in FIG. 3 can use the data fetch method shown in FIG. 9 or FIG. 10.

In some embodiments, based on the embodiment corresponding to FIG. 5, in another embodiment of the address generation method provided in the embodiments of this application, the vector parallelism corresponds to a vector level, the sliding window width range corresponds to a sliding window width level, the sliding window height range corresponds to a sliding window height level, the feature map width range corresponds to a feature map width level, the feature map height range corresponds to a feature map height level, the maximum slice value range corresponds to a slice level, and the maximum batch value corresponds to a batch level. The method further includes:

disabling, in accordance with a determination that a start count and an end count corresponding to the vector level are the same, a loop function corresponding to the vector level;

disabling, in accordance with a determination that a start count and an end count corresponding to the sliding window width level are the same, a loop function corresponding to the sliding window width level;

disabling, in accordance with a determination that a start count and an end count corresponding to the sliding window height level are the same, a loop function corresponding to the sliding window height level;

disabling, in accordance with a determination that a start count and an end count corresponding to the feature map width level are the same, a loop function corresponding to the feature map width level;

disabling, in accordance with a determination that a start count and an end count corresponding to the feature map height level are the same, a loop function corresponding to the feature map height level;

disabling, in accordance with a determination that a start count and an end count corresponding to the slice level are the same, a loop function corresponding to the slice level; and disabling, in accordance with a determination that a start count and an end count corresponding to the batch level are the same, a loop function corresponding to the batch level.

In this embodiment, a method for configuring and controlling enabling of multiple levels of counters is described. For L0_CNT to L6_CNT (the vector level, the sliding window width level, the sliding window height level, the feature map width level, the feature map height level, the slice level, and the batch level), each level corresponds to a loop. If a level has no loop, cnt_start=cnt_end is configured to disable the level. In this application, levels of a vector loop, a sliding window width loop, a sliding window height loop, a feature map width loop, a feature map height loop, a slice loop, and a batch loop are in ascending order.

Specifically, for a vector loop, a loop function corresponding to the vector loop is disabled in accordance with a determination that a start count and an end count corresponding to the vector loop are the same. For a sliding window width loop, a loop function corresponding to the sliding window width loop is disabled in accordance with a determination that a start count and an end count corresponding to the sliding window width loop are the same. For a sliding window height loop, a loop function corresponding to the sliding window height loop is disabled in accordance with a determination that a start count and an end count corresponding to the sliding window height loop are the same. For a feature map width loop, a loop function corresponding to the feature map width loop is disabled in accordance with a determination that a start count and an end count corresponding to the feature map width loop are the same. For a feature map height loop, a loop function corresponding to the feature map height loop is disabled in accordance with a determination that a start count and an end count corresponding to the feature map height loop are the same. For a slice loop, a loop function corresponding to the slice loop is disabled in accordance with a determination that a start count and an end count corresponding to the slice loop are the same. For a batch loop, a loop function corresponding to the batch loop is disabled in accordance with a determination that a start count and an end count corresponding to the batch loop are the same.

In this embodiment of this application, a method for configuring and controlling enabling of multiple levels of counters is provided. In the method, a start count and an end count corresponding to a loop can be configured to be the same value, to disable a corresponding loop function and control enabling of the multiple levels of counters, thereby improving feasibility of this solution.

In some embodiments, based on the embodiment corresponding to FIG. 5, in another embodiment of the address generation method provided in the embodiments of this application, the vector level corresponds to a first loop start signal and a second loop end signal;

the sliding window width level corresponds to a second loop start signal and a second loop end signal;

the sliding window height level corresponds to a third loop start signal and a third loop end signal;

the feature map width level corresponds to a fourth loop start signal and a fourth loop end signal;

the feature map height level corresponds to a fifth loop start signal and a fifth loop end signal;

the slice level corresponds to a sixth loop start signal and a sixth loop end the signal; and the batch level corresponds to a seventh loop start signal and a seventh loop end signal.

In this embodiment, a method for generating control signals is described. Multiple groups of control signals may be generated for CNTs corresponding to multiple loops in the AGU. Each group of control signals include a loop start signal (Lx_LOOP_START) and a loop end signal (Lx_LOOP_END) corresponding to a different loop. For L0_CNT to L6_CNT (the vector level, the sliding window width level, the sliding window height level, the feature map width level, the feature map height level, the slice level, and the batch level), 7 groups of control signals (that is, 14 control signals) can be generated, and the control signals can be used as start signals and end signals of the operation in the ALU. For example, during the operation in the ALU, a maximum value of data in the window needs to be determined through comparison between values. In the first clock, there is no value for comparison. For example, two values may be obtained for comparison only from the sixth clock. In the last clock, not only values need to be compared, but also a result needs to be outputted. Based on this, Lx_LOOP_START controls the first clock. Although in the first clock, there is no data for comparison, corresponding L1_LOOP_START can enable execution of the first data operation in the saved window from the sixth clock. In the last clock, an L1_LOOP_END signal is configured as a trigger signal for the last comparison, and a final comparison result in the window is outputted. The control signal dynamically changes according to an actual case. Besides, the AGU only needs to send a control signal corresponding to each loop to the ALU. The ALU selects Lx_LOOP_END of corresponding Lx_LOOP_START based on the configuration parameter in the VLIW to complete a required operation.

If the count is equal to the start count or the count does not fall within the count range for each level in each clock, a control signal is sent to the ALU, that is, a loop start signal and a loop end signal are transmitted to the ALU synchronously along with data.

Specifically, the vector level corresponds to the first loop start signal and the first loop end signal, that is, at the vector level, the first loop start signal and the first loop end signal are transmitted to the ALU synchronously along with data.

The sliding window width level corresponds to the second loop start signal and the second loop end signal, that is, at the sliding window width level, the second loop start signal and the second loop end signal are transmitted to the ALU synchronously along with data.

The sliding window height level corresponds to the third loop start signal and the third loop end signal, that is, at the sliding window height level, the third loop start signal and the third loop end signal are transmitted to the ALU synchronously along with data.

The feature map width level corresponds to the fourth loop start signal and the fourth loop end signal, that is, at the feature map width level, the fourth loop start signal and the fourth loop end signal are transmitted to the ALU synchronously along with data.

The sliding window height level corresponds to the fifth loop start signal and the fifth loop end signal, that is, at the sliding window height level, the fifth loop start signal and the fifth loop end signal are transmitted to the ALU synchronously along with data.

The slice level corresponds to the sixth loop start signal and the sixth loop end signal, that is, at the slice level, the sixth loop start signal and the sixth loop end signal are transmitted to the ALU synchronously along with data.

The batch level corresponds to the seventh loop start signal and the seventh loop end signal, that is, at the batch level, the seventh loop start signal and the seventh loop end signal are transmitted to the ALU synchronously along with data.

In this embodiment of this application, a method for generating a control signal is provided. In the method, when a loop function corresponding to a loop needs to be enabled or disabled, a loop start signal or a loop end signal can be used for control, thereby improving control flexibility.

Figure 11:
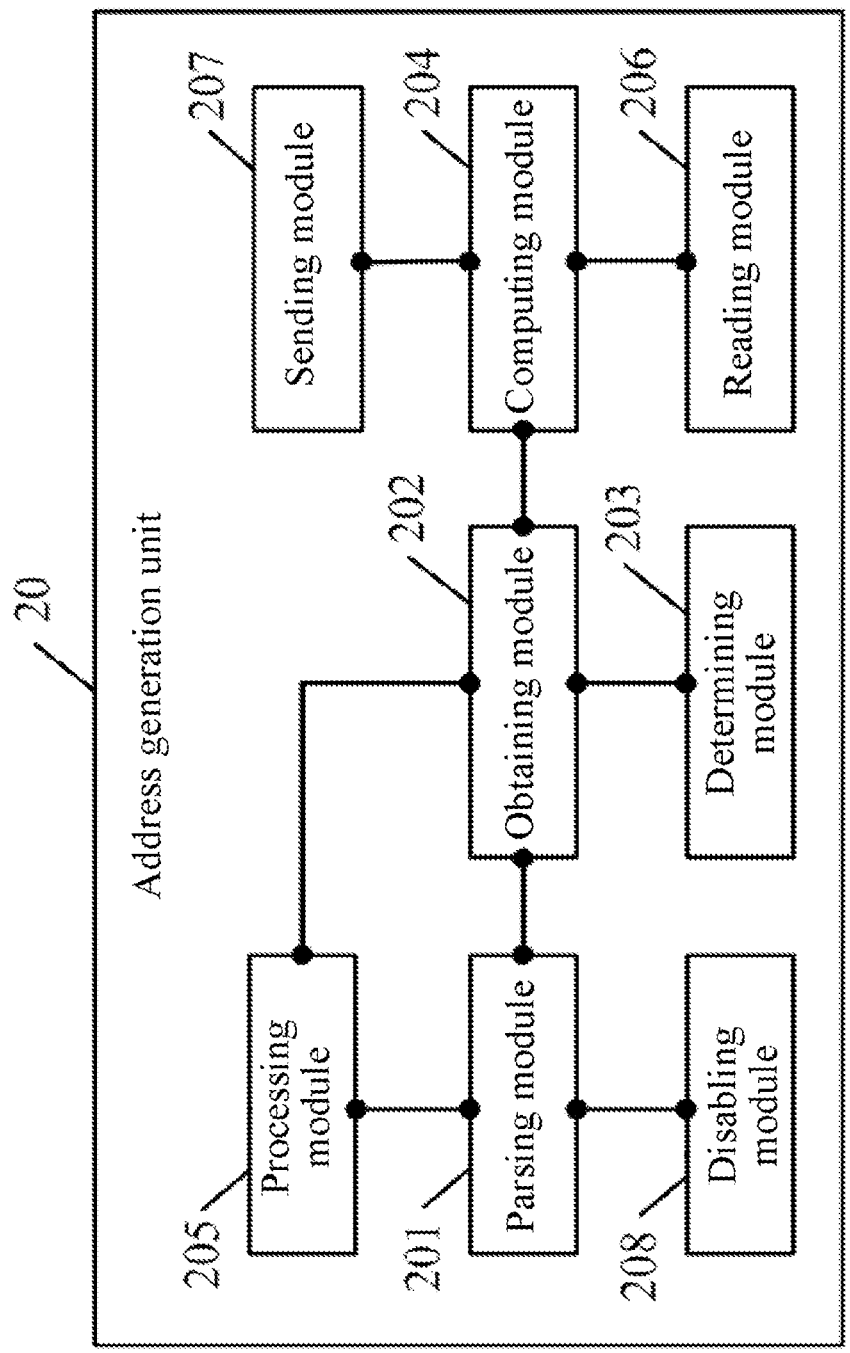
FIG. 11 is a schematic diagram of an embodiment of an address generation unit according to embodiments of this application.

An address generation unit in this application is described below in detail. FIG. 11 is a schematic diagram of an embodiment of an address generation unit according to embodiments of this application. An address generation unit 20 includes:

a parsing module 201, configured to parse a very long instruction word to obtain an execution parameter, the execution parameter being used to determine a sliding window width range, a sliding window width stride, a sliding window height range, a sliding window height stride, a feature map width range, and a feature map height range;

an obtaining module 202, configured to obtain, in accordance with a determination that a depth count corresponding to the first target data does not fall within a depth count range, a first sliding window width count, a first sliding window height count, a first feature map width count, and a first feature map height count that correspond to the first target data;

a determining module 203, configured to determine an offset of the first target data according to the first sliding window width count, the sliding window width stride, the first sliding window height count, the sliding window height stride, the first feature map width count, and the first feature map height count in accordance with a determination that the first sliding window width count falls within the sliding window width range, the first sliding window height count falls within the sliding window height range, the first feature map width count falls within the feature map width range, and the first feature map height count falls within the feature map height range;

the obtaining module 202 being further configured to obtain a start address of the first target data; and a computing module 204, configured to add the start address to the offset, to obtain a first target address of the first target data.

In some embodiments, based on the embodiment corresponding to FIG. 11, in another embodiment of the address generation unit 20 provided in the embodiments of this application, the determining module 203 is specifically configured to: add the first sliding window width count to the sliding window width stride, to obtain a second sliding window width count;

add the first sliding window height count to the sliding window height stride, to obtain a second sliding window height count;

add the second sliding window width count to the first feature map width count, to obtain a width count;

add the second sliding window height count to the first feature map height count, to obtain a height count; and add a product result of the height count and a row gap coefficient to a product result of the width count and a column gap coefficient, to obtain the offset of the first target data.

In some embodiments, based on the embodiment corresponding to FIG. 11, in another embodiment of the address generation unit 20 provided in the embodiments of this application, the obtaining module 202 is specifically configured to: obtain a base address corresponding to the first target data, where the base address is a configuration parameter obtained by parsing the very long instruction word;

obtain a slice count and a batch count that correspond to the first target data;

add a product result of the slice count and a slice address increment to a product result of the batch count and a batch address increment, to obtain a total address increment, where both the slice address increment and the batch address increment are configuration parameters obtained by parsing the very long instruction word; and add the total address increment to the base address, to obtain the start address of the first target data.

In some embodiments, based on the embodiment corresponding to FIG. 11, in another embodiment of the address generation unit 20 provided in the embodiments of this application, the address generation unit further includes a processing module.

A processing module 205 is configured to perform a carry operation on the first sliding window width count and perform reset processing on the depth count in the case that the depth count corresponding to the first target data does not fall within the depth count range.

In some embodiments, based on the embodiment corresponding to FIG. 11, in another embodiment of the address generation unit 20 provided in the embodiments of this application, the execution parameter is further used to determine a feature map width stride; and the processing module 205 is further configured to perform a carry operation on the first sliding window height count and perform reset processing on the first sliding window width count in accordance with a determination that the first sliding window width count does not fall within the sliding window width range and the first sliding window height count falls within the sliding window height range; or the processing module 205 is further configured to perform a carry operation on the first feature map width count and perform reset processing on the first sliding window width count, the first sliding window height count, and the depth count in accordance with a determination that the first sliding window width count does not fall within the sliding window width range and the first sliding window height count does not fall within the sliding window height range.

The processing module 205 is specifically configured to add the first feature map width count to the feature map width stride, to obtain a second feature map width count.

In some embodiments, based on the embodiment corresponding to FIG. 11, in another embodiment of the address generation unit 20 provided in the embodiments of this application, the execution parameter is further used to determine a feature map height stride; and the processing module 205 is further configured to perform a carry operation on the first feature map height count and perform reset processing on the first feature map width count in accordance with a determination that the first feature map width count does not fall within the feature map width range and the first feature map height count falls within the feature map height range; or the processing module 205 is further configured to perform a carry operation on a slice count and perform reset processing on the first sliding window width count, the first sliding window height count, the first feature map width count, the first feature map height count, and the depth count in accordance with a determination that the first feature map height count does not fall within the feature map height range.

The processing module 205 is specifically configured to add the first feature map height count to the feature map height stride, to obtain a second feature map height count.

In some embodiments, based on the embodiment corresponding to FIG. 11, in another embodiment of the address generation unit 20 provided in the embodiments of this application, the processing module 205 is further configured to perform a carry operation on a batch count and perform reset processing on a slice count, the first sliding window width count, the first sliding window height count, the first feature map width count, the first feature map height count, and the depth count in accordance with a determination that the slice count does not fall within a maximum slice value range, where the maximum slice value range is determined according to a tensor depth value and vector parallelism that correspond to the first target data; and the processing module 205 is further configured to perform reset processing on the batch count, the slice count, the first sliding window width count, the first sliding window height count, the first feature map width count, the first feature map height count, and the depth count in accordance with a determination that the batch count is greater than or equal to a maximum batch value, where the maximum batch value is a configuration parameter obtained by parsing the very long instruction word.

In some embodiments, based on the embodiment corresponding to FIG. 11, in another embodiment of the address generation unit 20 provided in the embodiments of this application, the address generation unit further includes a reading module and a sending module.

A reading module 206 is configured to: after the start address is added to the offset, to obtain the first target address of the first target data, read the first target data through a first data channel based on the first target address.

A sending module 207 is configured to send the first target data to an arithmetic logical unit through a second data channel.

The reading module 206 is further configured to: after the start address is added to the offset, to obtain the first target address of the first target data, when obtaining a second target address of second target data, read the second target data through a third data channel based on the second target address, where the second target address is a next physical address adjacent to the first target address.

The sending module 207 is further configured to send the second target data to the arithmetic logical unit through a fourth data channel.

In some embodiments, based on the embodiment corresponding to FIG. 11, in another embodiment of the address generation unit 20 provided in the embodiments of this application, the reading module 206 is further configured to: after the start address is added to the offset, to obtain the first target address of the first target data, read the first target data through a first data channel based on the first target address.

The sending module 207 is further configured to send the first target data to an arithmetic logical unit through a second data channel.

The reading module 206 is further configured to: after the start address is added to the offset, to obtain the first target address of the first target data, when obtaining a second target address of second target data, read the second target data through a first data channel based on the second target address, where the second target address is a next physical address adjacent to the first target address.

The sending module 207 is further configured to send the second target data to the arithmetic logical unit through a third data channel.

In some embodiments, based on the embodiment corresponding to FIG. 11, in another embodiment of the address generation unit 20 provided in the embodiments of this application, the vector parallelism corresponds to a vector level, the sliding window width range corresponds to a sliding window width level, the sliding window height range corresponds to a sliding window height level, the feature map width range corresponds to a feature map width level, the feature map height range corresponds to a feature map height level, the maximum slice value range corresponds to a slice level, and the maximum batch value corresponds to a batch level.

The address generation unit further includes a disabling module 208.

The disabling module 208 is configured to disable, in accordance with a determination that a start count and an end count corresponding to the vector level are the same, a loop function corresponding to the vector level.

The disabling module 208 is further configured to disable, in accordance with a determination that a start count and an end count corresponding to the sliding window width level are the same, a loop function corresponding to the sliding window width level.

The disabling module 208 is further configured to disable, in accordance with a determination that a start count and an end count corresponding to the sliding window height level are the same, a loop function corresponding to the sliding window height level.

The disabling module 208 is further configured to disable, in accordance with a determination that a start count and an end count corresponding to the feature map width level are the same, a loop function corresponding to the feature map width level.

The disabling module 208 is further configured to disable, in accordance with a determination that a start count and an end count corresponding to the feature map height level are the same, a loop function corresponding to the feature map height level.

The disabling module 208 is further configured to disable, in accordance with a determination that a start count and an end count corresponding to the slice level are the same, a loop function corresponding to the slice level.

The disabling module 208 is further configured to disable, in accordance with a determination that a start count and an end count corresponding to the batch level are the same, a loop function corresponding to the batch level.

In some embodiments, based on the embodiment corresponding to FIG. 11, in another embodiment of the address generation unit 20 provided in the embodiments of this application, the vector level corresponds to a first loop start signal and a second loop end signal;

the sliding window width level corresponds to a second loop start signal and a second loop end signal;

the sliding window height level corresponds to a third loop start signal and a third loop end signal;

the feature map width level corresponds to a fourth loop start signal and a fourth loop end signal;

the feature map height level corresponds to a fifth loop start signal and a fifth loop end signal;

the slice level corresponds to a sixth loop start signal and a sixth loop end the signal; and the batch level corresponds to a seventh loop start signal and a seventh loop end signal.

Figure 12:
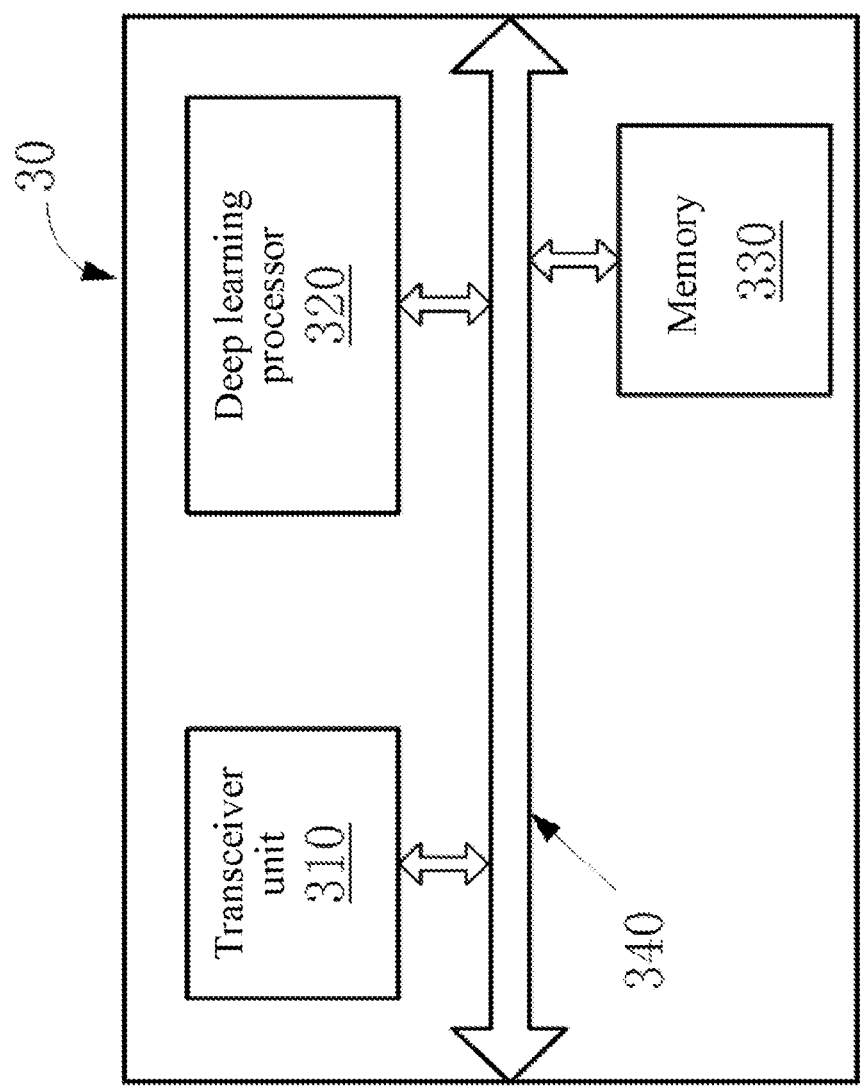
FIG. 12 is a schematic structural diagram of an electronic device according to an embodiment of this application.

FIG. 12 is a schematic structural diagram of an electronic device in an embodiment of this application. As shown in FIG. 12, the electronic device 30 may include a transceiver unit 310, a deep learning processor 320, and a memory 330.

In addition, the electronic device 30 may include, but is not limited to, a robot, a computer, a printer, a scanner, a tablet computer, a smart terminal, a mobile phone, a driving recorder, a navigator, a sensor, a camera, a cloud server, a camera, a video camera, a projector, a watch, a headset, a mobile storage, a wearables device, a means of transportation, a home appliance, and/or a medical device.

The memory 330 may include a read-only memory (ROM) and a random access memory (RAM), and provide an instruction and data to the deep learning processor 320. A part of the memory 330 may further include a non-volatile random access memory (NVRAM).

The memory 330 stores the following elements, executable modules or data structures, or a subset thereof, or an extended set thereof:

operation instructions: including various operation instructions, used for implementing various operations; and operating system: including various system programs, used for implementing various basic services and processing hardware-based tasks.

In this embodiment of the present disclosure, the deep learning processor 320 is configured to:

parse a very long instruction word (VLIW) to obtain an execution parameter, the execution parameter being used to determine a sliding window width range, a sliding window width stride, a sliding window height range, a sliding window height stride, a feature map width range, and a feature map height range;

obtain, in accordance with a determination that a depth count corresponding to the first target data does not fall within a depth count range, a first sliding window width count, a first sliding window height count, a first feature map width count, and a first feature map height count that correspond to the first target data;

determine an offset of the first target data according to the first sliding window width count, the sliding window width stride, the first sliding window height count, the sliding window height stride, the first feature map width count, and the first feature map height count in accordance with a determination that the first sliding window width count falls within the sliding window width range, the first sliding window height count falls within the sliding window height range, the first feature map width count falls within the feature map width range, and the first feature map height count falls within the feature map height range;

obtain a start address of the first target data; and add the start address to the offset, to obtain a first target address of the first target data.

The deep learning processor 320 controls the operation of the electronic device 30, and may also be referred to as a CPU. The memory 330 may include a read-only memory (ROM) and a random access memory (RAM), and provide an instruction and data to the deep learning processor 320. The memory 330 may include a read-only memory (ROM) and a random access memory (RAM), and provide an instruction and data to the deep learning processor 320. During specific application, components of the electronic device 30 are coupled together by using a bus system 340. In addition to a data bus, the bus system 340 may further include a power bus, a control bus, a status signal bus, and the like. However, for ease of clear description, all types of buses are marked as the bus system 340 in the figure.

The method disclosed in the foregoing embodiment of the present invention may be applied to the deep learning processor 320, or implemented by the deep learning processor 320. The deep learning processor 320 may be an integrated circuit chip, having a capability of processing a signal. In an implementation process, steps in the foregoing methods can be implemented by using a hardware integrated logical circuit in the deep learning processor 320, or by using instructions in a form of software. The foregoing deep learning processor 320 may be a general purpose processor, a digital signal processor (DSP), an application-specific integrated circuit (ASIC), a field-programmable gate array (FPGA) or another programmable logic device, a discrete gate or a transistor logic device, or a discrete hardware component. The general-purpose processor may be a microprocessor, or the processor may be any conventional processor or the like. The steps in the methods disclosed with reference to the embodiments of the present disclosure may be directly embodied as to be executed and completed by a hardware decoding processor or to be executed and completed by a combination of hardware and software modules in the decoding processor. The software module may be stored in a storage medium that is mature in the art, such as a RAM, a flash memory, a read-only memory (ROM), a programmable ROM, an electrically erasable programmable memory, or a register. The storage medium is located in the memory 330, and the deep learning processor 320 reads information in the memory 330, and completes the steps in the foregoing methods in combination with hardware thereof.

In this embodiment of this application, the deep learning processor 320 included in the electronic device 30 is configured to execute the embodiments corresponding to FIG. 5. Details are not repeated herein.

An embodiment of this application further provides a non-transitory computer-readable storage medium, storing a computer program. When the computer program runs on a computer, the computer is caused to perform steps performed by the client in the methods in the embodiments of FIG. 5 to FIG. 9.

An embodiment of this application further provides a computer program product including instructions. When the computer program product runs on a computer, the computer is caused to perform steps performed by the client in the methods in the embodiments of FIG. 5 to FIG. 9.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs group operation processing and/or transmitting. In practical application, the foregoing functions may be allocated to and completed by different functional modules according to requirements, that is, an inner structure of a device is divided into different functional modules to implement all or a part of the functions described above.

What is claimed is:

1. A method for generating an address for a deep learning processor, comprising:

parsing a very long instruction word (VLIW) to obtain an execution parameter;

determining a sliding window width range, a sliding window width stride, a sliding window height range, a sliding window height stride, a feature map width range, and a feature map height range from the execution parameter;

in accordance with a determination that a depth count corresponding to a first target data does not fall within a depth count range, obtaining a first sliding window width count, a first sliding window height count, a first feature map width count, and a first feature map height count corresponding to the first target data;

in accordance with a determination that: (i) the first sliding window width count falls within the sliding window width range, (ii) the first sliding window height count falls within the sliding window height range, (iii) the first feature map width count falls within the feature map width range, and (iv) the first feature map height count falls within the feature map height range, determining an offset of the first target data according to the first sliding window width count, the sliding window width stride, the first sliding window height count, the sliding window height stride, the first feature map width count, and the first feature map height count;

obtaining a starting address of the first target data; and adding the starting address to the offset, to obtain a first target address of the first target data.

2. The method according to claim 1, wherein determining the offset of the first target data includes:
adding the first sliding window width count and the sliding window width stride to obtain a second sliding window width count;
adding the first sliding window height count and the sliding window height stride to obtain a second sliding window height count;
adding the second sliding window width count and the first feature map width count to obtain a width count;
adding the second sliding window height count and the first feature map height count to obtain a height count; and
adding (i) a product result of the height count and a row gap coefficient and (ii) a product result of the width count and a column gap coefficient, to obtain the offset of the first target data.

3. The method according to claim 1, wherein the obtaining the starting address of the first target data comprises:
obtaining a base address corresponding to the first target data, wherein the base address is a configuration parameter obtained by parsing the VLIW;
obtaining a slice count and a batch count that correspond to the first target data;
adding a product result of the slice count and a slice address increment to a product result of the batch count and a batch address increment, to obtain a total address increment, wherein both the slice address increment and the batch address increment are configuration parameters obtained by parsing the VLIW; and
adding the total address increment to the base address, to obtain the start address of the first target data.

4. The method according to claim 1, further comprising:
in accordance with a determination that the depth count corresponding to the first target data does not fall within the depth count range, performing a carry operation on the first sliding window width count and performing reset processing on the depth count.

5. The method according to claim 1, further comprising:
determining a feature map width stride from the execution parameter; and
in accordance with a determination that the first sliding window width count does not fall within the sliding window width range and the first sliding window height count falls within the sliding window height range, performing a carry operation on the first sliding window height count and performing reset processing on the first sliding window width count; or
in accordance with a determination that the first sliding window width count does not fall within the sliding window width range and the first sliding window height count does not fall within the sliding window height range, performing a carry operation on the first feature map width count and performing reset processing on the first sliding window width count, the first sliding window height count, and the depth count,
wherein performing the carry operation on the first feature map width count comprises adding the first feature map width count and the feature map width stride to obtain a second feature map width count.

6. The method according to claim 1, further comprising:
determining a feature map height stride from the execution parameter; and
in accordance with a determination that the first feature map width count does not fall within the feature map width range, performing reset processing on the first feature map width count;
in accordance with a determination that the first feature map height count does not fall within the feature map height range, performing a carry operation on the first feature map height count and performing reset processing on the first feature map height count, wherein performing the carry operation on the first feature map height count comprises adding the first feature map height count and the feature map height stride to obtain a second feature map height count; or
in accordance with a determination that the first feature map height count does not fall within the feature map height range, performing a carry operation on a slice count and performing reset processing on the first sliding window width count, the first sliding window height count, the first feature map width count, the first feature map height count, and the depth count.

7. The method according to claim 1, further comprising:
in accordance with a determination that the slice count does not fall within a maximum slice value range:
performing a carry operation on a batch count; and
performing reset processing on a slice count, the first sliding window width count, the first sliding window height count, the first feature map width count, the first feature map height count, and the depth count, wherein the maximum slice value range is determined according to a tensor depth value and vector parallelism that correspond to the first target data; or
in accordance with a determination that the batch count is greater than or equal to a maximum batch value, performing reset processing on the batch count, the slice count, the first sliding window width count, the first sliding window height count, the first feature map width count, the first feature map height count, and the depth count, wherein the maximum batch value is a configuration parameter obtained by parsing the VLIW.

8. The method according to claim 1, further comprising:
after the adding the start address and the offset to obtain a first target address of the first target data: reading the first target data through a first data channel based on the first target address; and sending the first target data to an arithmetic logical unit through a second data channel.

9. The method according to claim 8, further comprising:
obtaining a second target address corresponding to second target data, wherein the second target address is a physical address adjacent to the first target address, and the obtaining includes reading the second target data through a third data channel based on the second target address; and
sending the second target data to the arithmetic logical unit through a fourth data channel.

10. The method according to claim 8, further comprising:
obtaining a second target address corresponding to second target data, wherein the second target address is a physical address adjacent to the first target address, and the obtaining includes reading the second target data through the first data channel based on the second target address; and
sending the second target data to the arithmetic logical unit through a third data channel.

11. The method according to claim 7, wherein the vector parallelism corresponds to a vector level, the sliding window width range corresponds to a sliding window width level, the sliding window height range corresponds to a sliding window height level, the feature map width range corresponds to a feature map width level, the feature map height range corresponds to a feature map height level, the maximum slice value range corresponds to a slice level, and the maximum batch value corresponds to a batch level; and the method further comprises:
  in accordance with a determination that a start count and an end count corresponding to the vector level are the same, disabling a loop function corresponding to the vector level;
  in accordance with a determination that a start count and an end count corresponding to the sliding window width level are the same, disabling a loop function corresponding to the sliding window width level;
  in accordance with a determination that a start count and an end count corresponding to the sliding window height level are the same, disabling a loop function corresponding to the sliding window height level;
  in accordance with a determination that a start count and an end count corresponding to the feature map width level are the same, disabling a loop function corresponding to the feature map width level;
  in accordance with a determination that a start count and an end count corresponding to the feature map height level are the same, disabling a loop function corresponding to the feature map height level;
  in accordance with a determination that a start count and an end count corresponding to the slice level are the same, disabling a loop function corresponding to the slice level; or
  in accordance with a determination that a start count and an end count corresponding to the batch level are the same, disabling a loop function corresponding to the batch level.

12. The method according to claim 11, wherein the vector level corresponds to a first loop start signal and a first loop end signal;
  the sliding window width level corresponds to a second loop start signal and a second loop end signal;
  the sliding window height level corresponds to a third loop start signal and a third loop end signal;
  the feature map width level corresponds to a fourth loop start signal and a fourth loop end signal;
  the feature map height level corresponds to a fifth loop start signal and a fifth loop end signal;
  the slice level corresponds to a sixth loop start signal and a sixth loop end the signal; and
  the batch level corresponds to a seventh loop start signal and a seventh loop end signal.

13. A computer system, comprising:
  one or more processors; and
  memory storing one or more programs, the one or more programs comprising instructions that, when executed by the one or more processors, cause the one or more processors to perform operations comprising:
    parsing a very long instruction word (VLIW) to obtain an execution parameter:
    determining a sliding window width range, a sliding window width stride, a sliding window height range, a sliding window height stride, a feature map width range, and a feature map height range from the execution parameter;
    in accordance with a determination that a depth count corresponding to a first target data does not fall within a depth count range, obtaining a first sliding window width count, a first sliding window height count, a first feature map width count, and a first feature map height count corresponding to the first target data;
    in accordance with a determination that: (i) the first sliding window width count falls within the sliding window width range, (ii) the first sliding window height count falls within the sliding window height range, (iii) the first feature map width count falls within the feature map width range, and (iv) the first feature map height count falls within the feature map height range, determining an offset of the first target data according to the first sliding window width count, the sliding window width stride, the first sliding window height count, the sliding window height stride, the first feature map width count, and the first feature map height count;
    obtaining a starting address of the first target data; and
    adding the starting address to the offset, to obtain a first target address of the first target data.

14. The computer system according to claim 13, wherein determining the offset of the first target data includes:
  adding the first sliding window width count and the sliding window width stride to obtain a second sliding window width count;
  adding the first sliding window height count and the sliding window height stride to obtain a second sliding window height count;
  adding the second sliding window width count and the first feature map width count to obtain a width count;
  adding the second sliding window height count and the first feature map height count to obtain a height count; and
  adding (i) a product result of the height count and a row gap coefficient and (ii) a product result of the width count and a column gap coefficient, to obtain the offset of the first target data.

15. The computer system according to claim 13, wherein obtaining the starting address of the first target data comprises:
  obtaining a base address corresponding to the first target data, wherein the base address is a configuration parameter obtained by parsing the VLIW;
  obtaining a slice count and a batch count that correspond to the first target data;
  adding a product result of the slice count and a slice address increment to a product result of the batch count and a batch address increment, to obtain a total address increment, wherein both the slice address increment and the batch address increment are configuration parameters obtained by parsing the VLIW; and
  adding the total address increment to the base address, to obtain the start address of the first target data.

16. The computer system according to claim 13, the operations further comprising:
  in accordance with a determination that the depth count corresponding to the first target data does not fall within the depth count range, performing a carry operation on the first sliding window width count and performing reset processing on the depth count.

17. The computer system according to claim 13, the operations further comprising:
  determining a feature map width stride from the execution parameter; and
  in accordance with a determination that the first sliding window width count does not fall within the sliding window width range and the first sliding window height count falls within the sliding window height range, performing a carry operation on the first sliding window height count and performing reset processing on the first sliding window width count; or in accordance with a determination that the first sliding window width count does not fall within the sliding window width range and the first sliding window height count does not fall within the sliding window height range, performing a carry operation on the first feature map width count and performing reset processing on the first sliding window width count, the first sliding window height count, and the depth count, wherein performing the carry operation on the first feature map width count comprises adding the first feature map width count and the feature map width stride to obtain a second feature map width count.

18. The computer system according to claim 13, the operations further comprising:

determining a feature map height stride from the execution parameter; and in accordance with a determination that the first feature map width count does not fall within the feature map width range, performing reset processing on the first feature map width count;

in accordance with a determination that the first feature map height count does not fall within the feature map height range, performing a carry operation on the first feature map height count and performing reset processing on the first feature map height count, wherein performing the carry operation on the first feature map height count comprises adding the first feature map height count and the feature map height stride to obtain a second feature map height count; or in accordance with a determination that the first feature map height count does not fall within the feature map height range, performing a carry operation on a slice count and performing reset processing on the first sliding window width count, the first sliding window height count, the first feature map width count, the first feature map height count, and the depth count.

19. The computer system according to claim 13, the operations further comprising:

in accordance with a determination that the slice count does not fall within a maximum slice value range:
performing a carry operation on a batch count; and
performing reset processing on a slice count, the first sliding window width count, the first sliding window height count, the first feature map width count, the first feature map height count, and the depth count, wherein the maximum slice value range is determined according to a tensor depth value and vector parallelism that correspond to the first target data; and in accordance with a determination that the batch count is greater than or equal to a maximum batch value, performing reset processing on the batch count, the slice count, the first sliding window width count, the first sliding window height count, the first feature map width count, the first feature map height count, and the depth count, wherein the maximum batch value is a configuration parameter obtained by parsing the VLIW.

20. A non-transitory computer-readable storage medium, storing a computer program, the computer program, when executed by one or more processors of a computer system, cause the one or more processors to perform operations comprising:

parsing a very long instruction word (VLIW) to obtain an execution parameter;

determining a sliding window width range, a sliding window width stride, a sliding window height range, a sliding window height stride, a feature map width range, and a feature map height range from the execution parameter;

in accordance with a determination that a depth count corresponding to a first target data does not fall within a depth count range, obtaining a first sliding window width count, a first sliding window height count, a first feature map width count, and a first feature map height count corresponding to the first target data;

in accordance with a determination that: (i) the first sliding window width count falls within the sliding window width range, (ii) the first sliding window height count falls within the sliding window height range, (iii) the first feature map width count falls within the feature map width range, and (iv) the first feature map height count falls within the feature map height range, determining an offset of the first target data according to the first sliding window width count, the sliding window width stride, the first sliding window height count, the sliding window height stride, the first feature map width count, and the first feature map height count;

obtaining a starting address of the first target data; and adding the starting address to the offset, to obtain a first target address of the first target data.

* * * * *